(12) United States Patent
Inomoto

(10) Patent No.: US 11,294,156 B2
(45) Date of Patent: Apr. 5, 2022

(54) ZOOM LENS AND IMAGE PICKUP APPARATUS

(71) Applicant: CANON KABUSHIKI KAISHA, Tokyo (JP)

(72) Inventor: Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 16/794,521

(22) Filed: Feb. 19, 2020

(65) Prior Publication Data
US 2020/0271907 A1 Aug. 27, 2020

(30) Foreign Application Priority Data

Feb. 22, 2019 (JP) .............................. JP2019-030905

(51) Int. Cl.
*G02B 15/14* (2006.01)
*G02B 9/36* (2006.01)
*G02B 13/02* (2006.01)
*G02B 27/00* (2006.01)
*H04N 5/225* (2006.01)

(52) U.S. Cl.
CPC ....... *G02B 15/144109* (2019.08); *G02B 9/36* (2013.01); *G02B 13/02* (2013.01); *G02B 27/005* (2013.01); *H04N 5/2254* (2013.01)

(58) Field of Classification Search
None
See application file for complete search history.

(56) References Cited

U.S. PATENT DOCUMENTS

| 6,124,982 A | 9/2000 | Usui |
| 9,264,638 B2 | 2/2016 | Nakamura et al. |
| 9,268,120 B2 | 2/2016 | Shimomura et al. |

(Continued)

FOREIGN PATENT DOCUMENTS

| CN | 101158744 A | 4/2008 |
| JP | 2009042346 A | 2/2009 |
| WO | 2017158899 A1 | 9/2017 |

OTHER PUBLICATIONS

Extended European Search Report issued by the European Patent Office dated Jul. 16, 2020 in corresponding EP Patent Application No. 20158820.9.

(Continued)

*Primary Examiner* — Darryl J Collins
(74) *Attorney, Agent, or Firm* — Carter, DeLuca & Farrell LLP

(57) ABSTRACT

A zoom lens includes in order from an object side, a positive first unit, one or two second units including a negative lens unit closest to the image side, and monotonously moved to the image side for zooming to a telephoto end, one or two third units including a negative lens unit closest to the object side, and moved for zooming, and a positive fourth unit disposed closest to the image side, in which the first unit includes, in order from the object side, a negative subunit, a positive subunit moved for focusing, and a positive subunit, and a focal length of the first unit, a composite focal length at the telephoto end of the second unit, a maximum moving amount for zooming of the lens unit included in the second unit, and a maximum Abbe number of the negative lens included in the second unit are properly set.

8 Claims, 11 Drawing Sheets

(56) References Cited

U.S. PATENT DOCUMENTS

| | | |
|---|---|---|
| 9,291,800 B2 | 3/2016 | Inomoto et al. |
| 9,310,592 B2 | 4/2016 | Wakazono et al. |
| 9,715,092 B2 | 7/2017 | Inomoto |
| 10,338,359 B2 | 7/2019 | Kuwashiro et al. |
| 2012/0300118 A1* | 11/2012 | Shimomura ........... G02B 15/22 348/360 |
| 2013/0271850 A1* | 10/2013 | Shimomura ........... G02B 15/14 359/687 |
| 2014/0049681 A1* | 2/2014 | Shimomura ........... G02B 15/17 348/345 |
| 2015/0130969 A1* | 5/2015 | Nakamura ..... G02B 15/144109 348/240.3 |
| 2015/0131164 A1 | 5/2015 | Wakazono et al. |
| 2016/0062090 A1 | 3/2016 | Kawamura |
| 2017/0108677 A1* | 4/2017 | Shimomura ........... G02B 15/20 |
| 2017/0269374 A1* | 9/2017 | Takemoto ................ G02B 7/10 |
| 2018/0299652 A1 | 10/2018 | Inomoto |

OTHER PUBLICATIONS

Notice on the First Office Action issued by the National Intellectual Property Administration of the People's Republic of China dated Oct. 9, 2021 in corresponding CN Patent Application No. 202010103050.8, with English translation.

* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

Zoom lenses used in imaging apparatuses such as TV cameras, movie cameras, digital still cameras and video cameras are required to be compact and lightweight for high operability, and have wide angles of view, high zoom ratios and high optical performance. Further, along with increase in definition of imaging elements directed to the video standard 4K, 8K or the like, high resolution with high uniformity in the image plane and low chromatic aberration are required.

As zoom lenses compact and lightweight with wide angles of view and high magnification, the zoom lenses described in Japanese Patent Application Laid-Open No. 2009-42346, and International Publication No. WO2017/158899 are known. In order from an object side to an image side, each of the zoom lenses first has a first lens unit that does not move for zooming and has a positive refractive power. Next, the zoom lens has a second lens unit that moves for zooming and has a negative refractive power, and a third lens unit that moves for zooming (compensation of image plane variation) and has a negative refractive power. Furthermore, the zoom lens has an aperture stop, and a fourth lens unit that does not move for zooming and has a positive refractive power. The first lens unit includes a 1-1 lens unit having a negative refractive power, a 1-2 lens unit having a positive refractive power, and a 1-3 lens unit having a positive refractive power. The zoom lens adopts an inner focus method, and the 1-2 lens unit of the first lens unit moves for focusing.

Further improvement in reduction in size and weight, a wide angle of view and a high zoom ratio, in particular, a wider angle in such a zoom lens is difficult in terms of high optical performance over the entire zoom range, such as chromatic aberration of magnification in a wide angle end.

SUMMARY OF THE INVENTION

An aspect of embodiments provides, for example, a zoom lens beneficial in small size and weight, wide angle of view, high zoom ratio and high optical performance.

A zoom lens of the present invention includes in order from an object side to an image side: a first lens unit having a positive refractive power and configured not to be moved for zooming; one or two second lens units including a lens unit closest to the image side and having a negative refractive power, the one or two second lens units configured to be monotonously moved to the image side for zooming from a wide angle end to a telephoto end; one or two third lens units including a lens unit closest to the object side and having a negative refractive power, the one or two third lens units configured to be moved for zooming; and a fourth lens unit closest to the image side and having a positive refractive power, in which the first lens unit comprises, in order from the object side to the image side, a 1a lens subunit having a negative refractive power and configured not to be moved for focusing, a 1b lens subunit having a positive refractive power and configured to be moved for focusing, and a 1c lens subunit having a positive refractive power and configured not to be moved for focusing, in which conditional expressions $$1.0 < |f1/f2t| < 2.5,$$

$$2.0 < |m2/f2t| < 5.0, \text{ and}$$

$$65 < \nu 2n$$

are satisfied where $f1$ represents a focal length of the first lens unit, $f2t$ represents a composite focal length at the telephoto end of the one or two second lens units, $m2$ represents a maximum moving amount of at least one moving amount, of at least one lens unit included in the one or two second lens units, for zooming from the wide angle end to the telephoto end, $\nu 2n$ represents a maximum Abbe number of at least one Abbe number of at least one negative lens included in the one or two second lens units, a sign of the moving amount is positive in a case where the lens unit moves to the image side, and an Abbe number $\nu$ is defined by an expression $$\nu = (nd-1)/(nF-nC)$$

where $nF$ represents a refractive index with respect to an F-line, $nd$ represents a refractive index with respect to a d-line, and $nC$ represents a refractive index with respect to a C-line.

Further features of the present invention will become apparent from the following description of exemplary embodiments with reference to the attached drawings.

DESCRIPTION OF THE EMBODIMENTS

Preferred embodiments of the present invention will now be described in detail with reference to the accompanying drawings.

Figure 1:
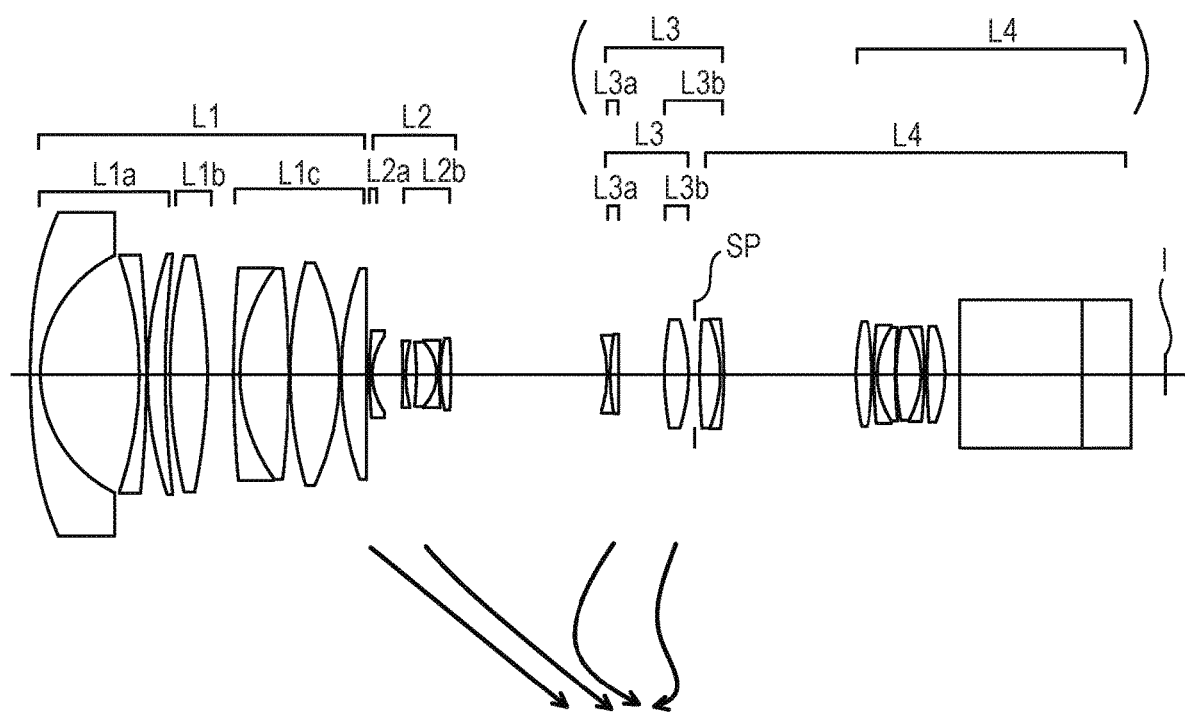
FIG. 1 is a lens sectional view focusing on an infinity object in a wide angle end of numerical embodiment 1.
Figure 2A:
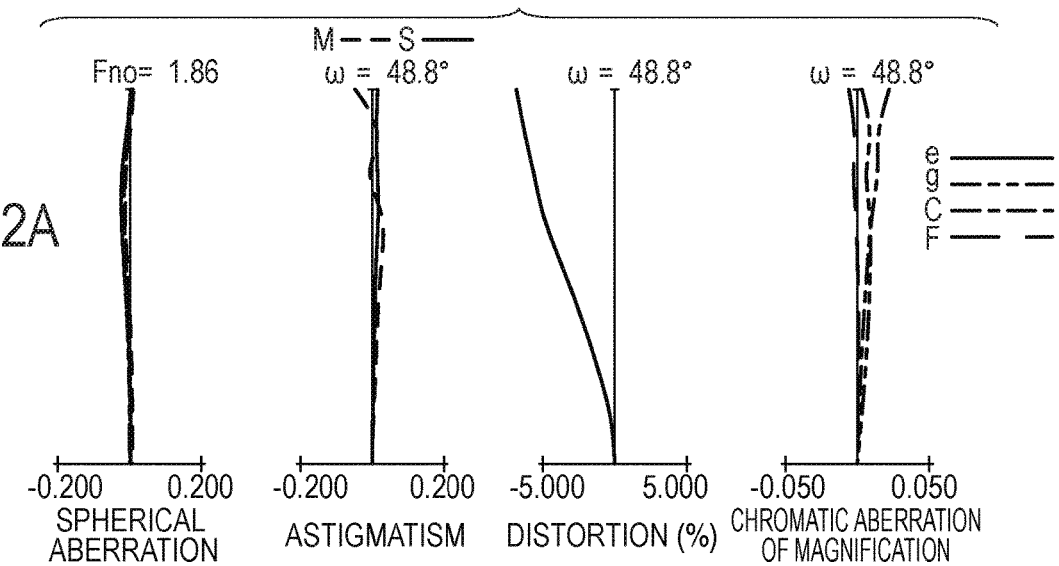
FIG. 2A is an aberration diagram focusing on the infinity object in the wide angle end of numerical embodiment 1.
Figure 2B:
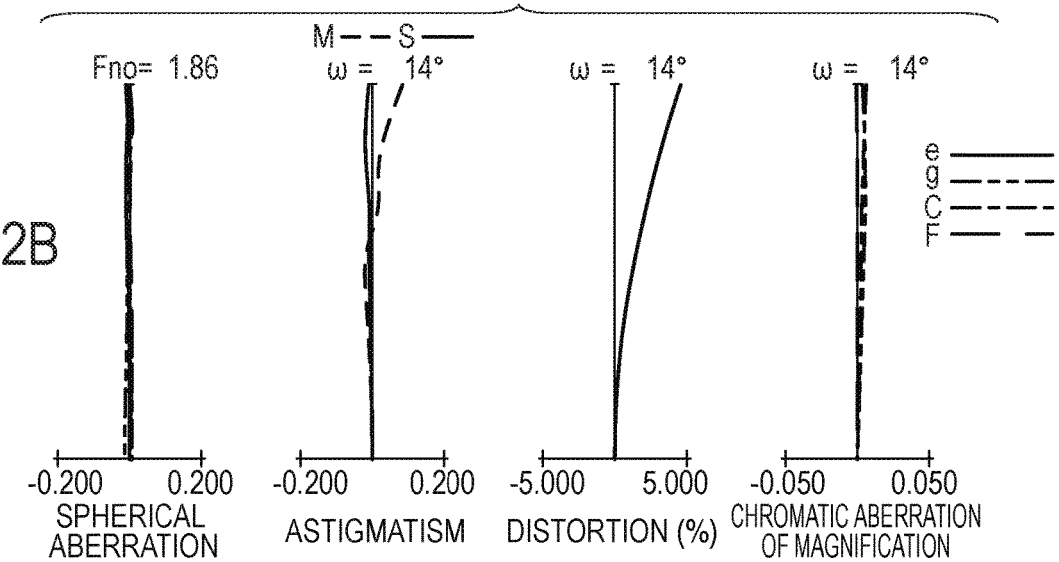
FIG. 2B is an aberration diagram focusing on the infinity object in a middle of zoom of numerical embodiment 1.
Figure 2C:
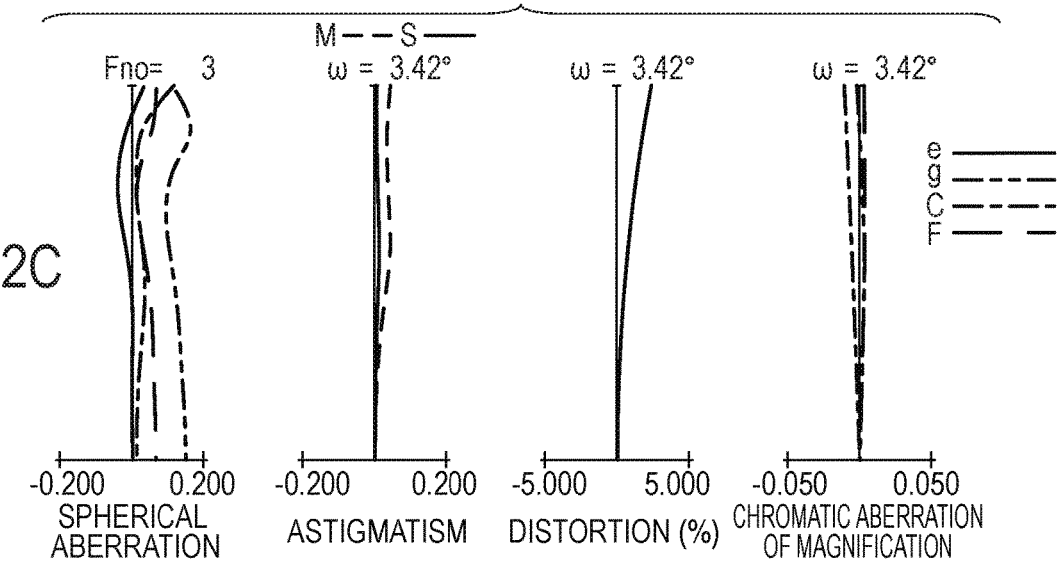
FIG. 2C is an aberration diagram focusing on the infinity object in a telephoto end of numerical embodiment 1.

FIG. 1 is a lens sectional view focusing on an infinity object (object at infinity) in a wide angle end of numerical embodiment 1 as embodiment 1 of the present invention. FIGS. 2A, 2B and 2C are respectively vertical aberration diagrams with focused on an infinity object in a wide angle end, a middle zoom position, a telephoto end (long focal length end) of numerical embodiment 1.

Figure 3:
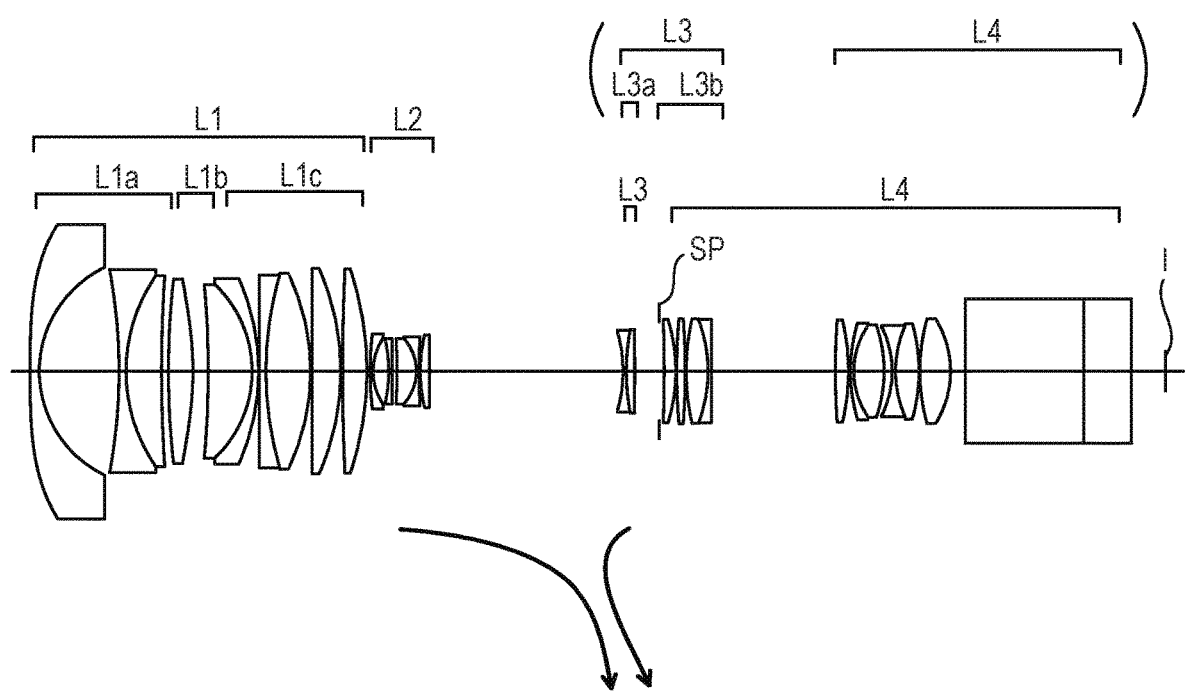
FIG. 3 is a lens sectional view focusing on an infinity object in a wide angle end of numerical embodiment 2.
Figure 4A:
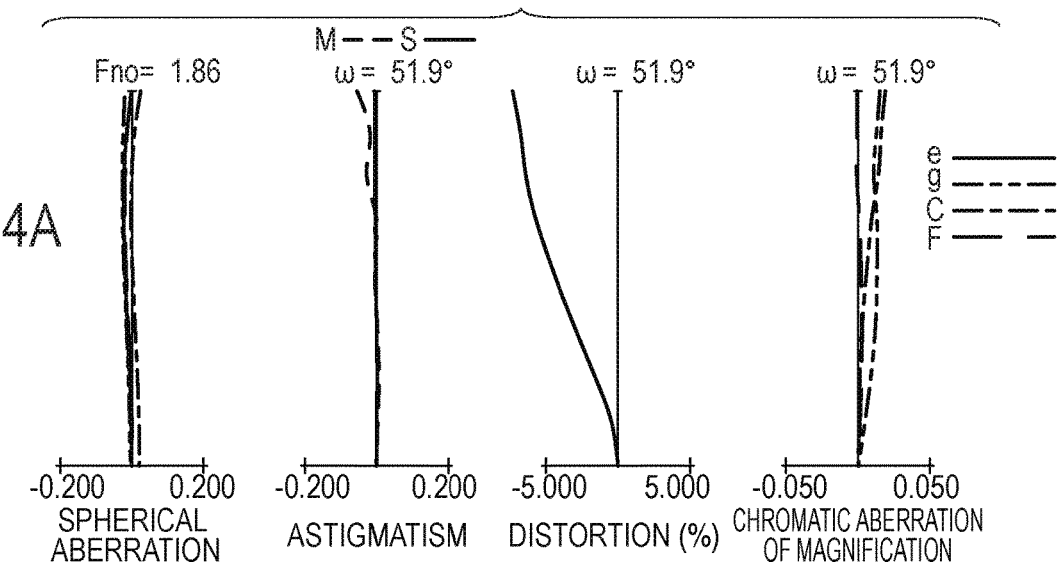
FIG. 4A is an aberration diagram focusing on the infinity object in the wide angle end of numerical embodiment 2.
Figure 4B:
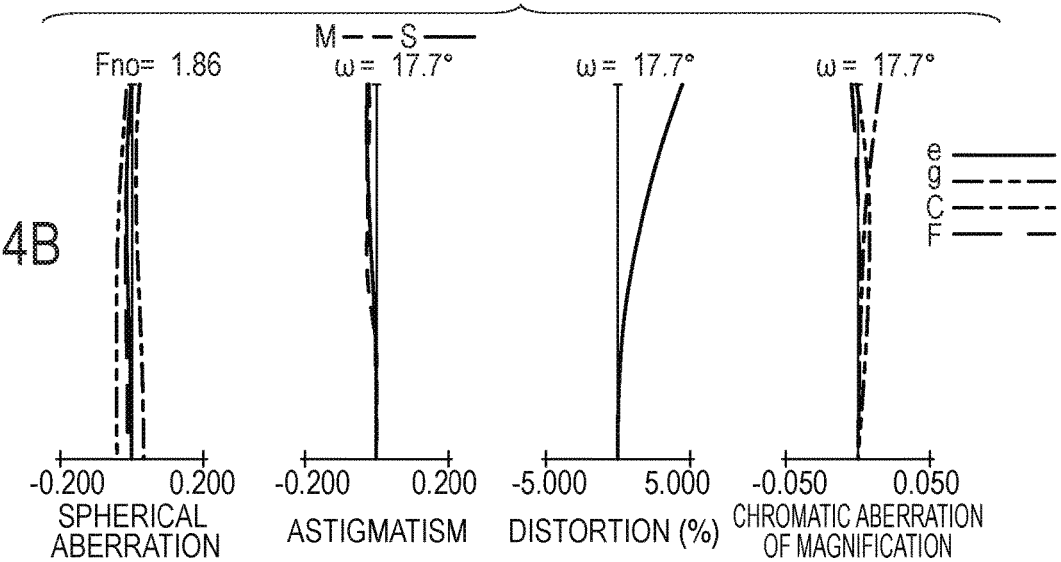
FIG. 4B is an aberration diagram focusing on the infinity object in a middle of zoom of numerical embodiment 2.
Figure 4C:
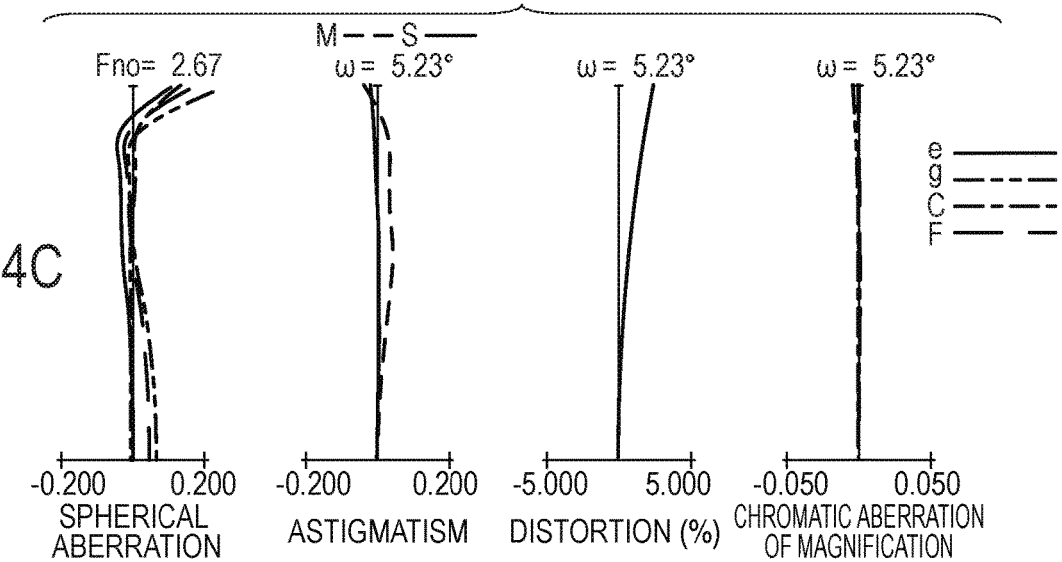
FIG. 4C is an aberration diagram focusing on the infinity object in a telephoto end of numerical embodiment 2.

FIG. 3 is a lens sectional view focusing on an infinity object in a wide angle end of numerical embodiment 2 as embodiment 2 of the present invention. FIGS. 4A, 4B and 4C are respectively vertical aberration diagrams with focused on an infinity object in a wide angle end, a middle zoom position, a telephoto end (long focal length end) of numerical embodiment 2.

Figure 5:
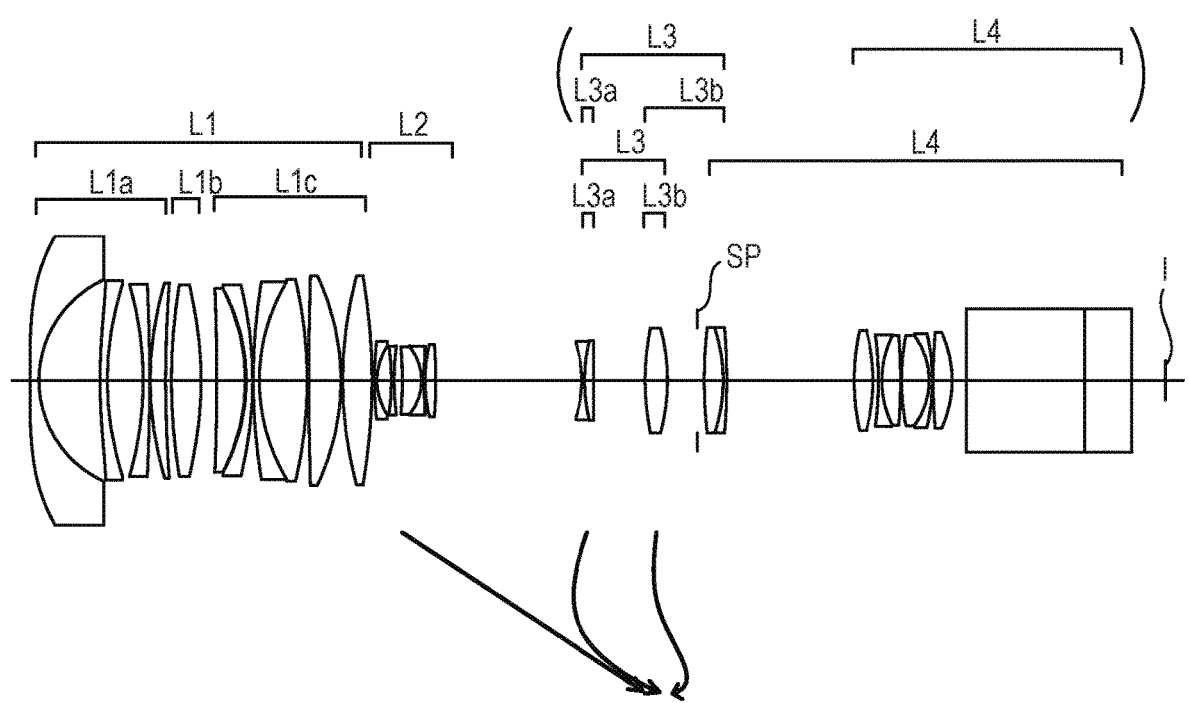
FIG. 5 is a lens sectional view focusing on an infinity object in a wide angle end of numerical embodiment 3.
Figure 6A:
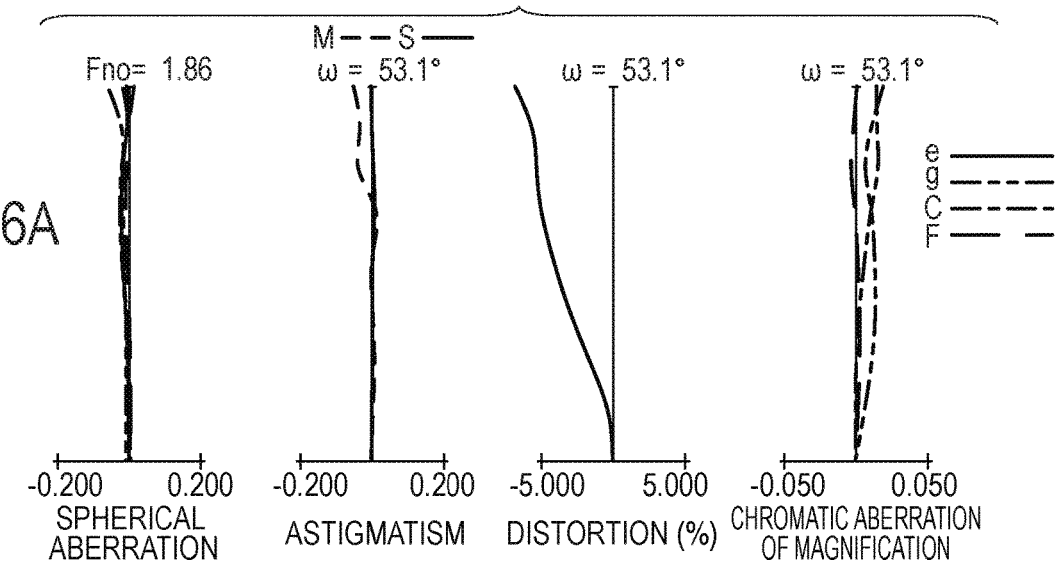
FIG. 6A is an aberration diagram focusing on infinity in the wide angle end of numerical embodiment 3.
Figure 6B:
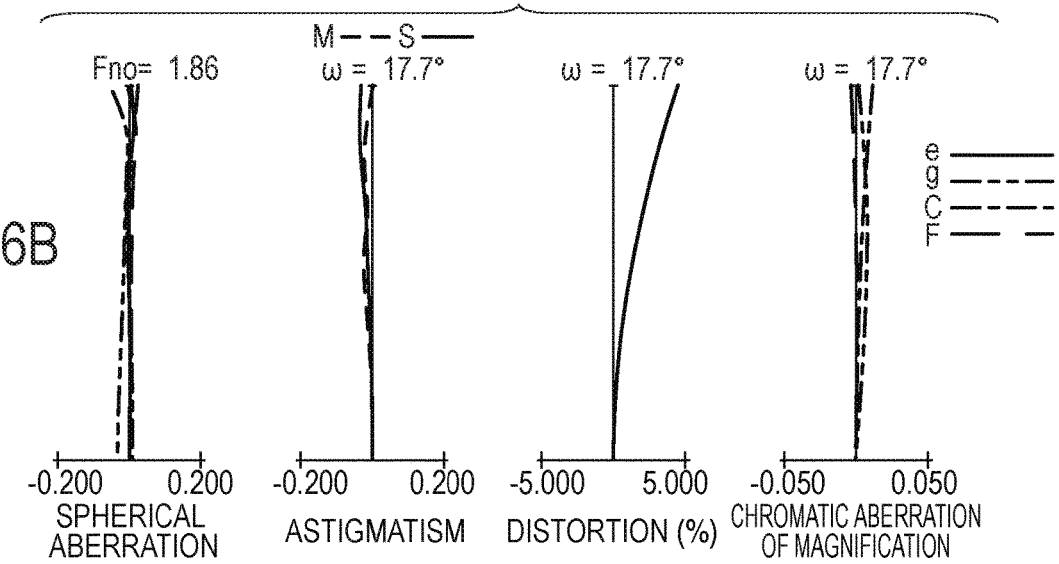
FIG. 6B is an aberration diagram focusing on infinity in a middle of zoom of numerical embodiment 3.
Figure 6C:
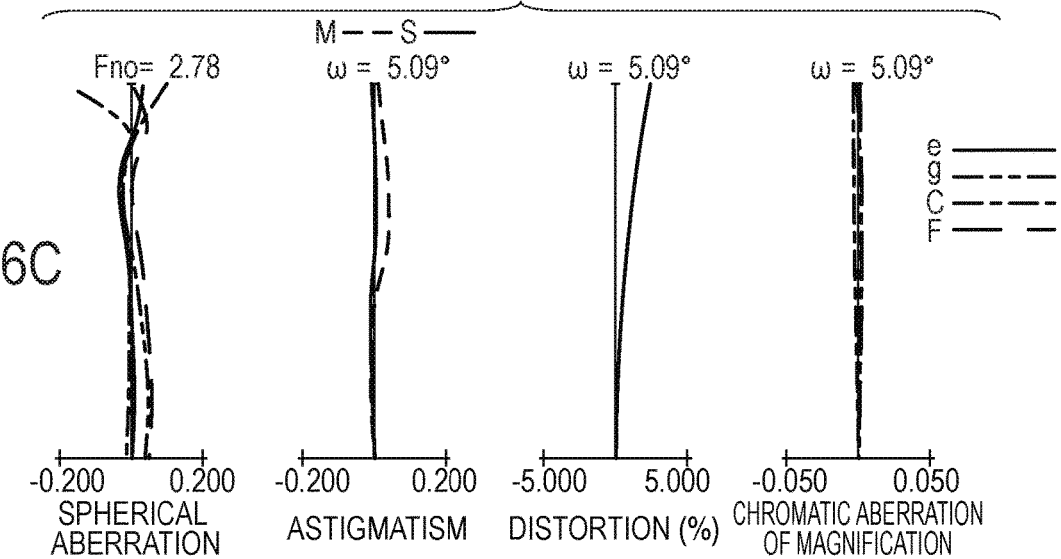
FIG. 6C is an aberration diagram focusing on infinity in a telephoto end of numerical embodiment 3.

FIG. 5 is a lens sectional view focusing on an infinity object in a wide angle end of numerical embodiment 3 as embodiment 3 of the present invention. FIGS. 6A, 6B and 6C are respectively vertical aberration diagrams with focused on an infinity object in a wide angle end, a middle zoom position and a telephoto end (long focal length end) of numerical embodiment 3.

Figure 7:
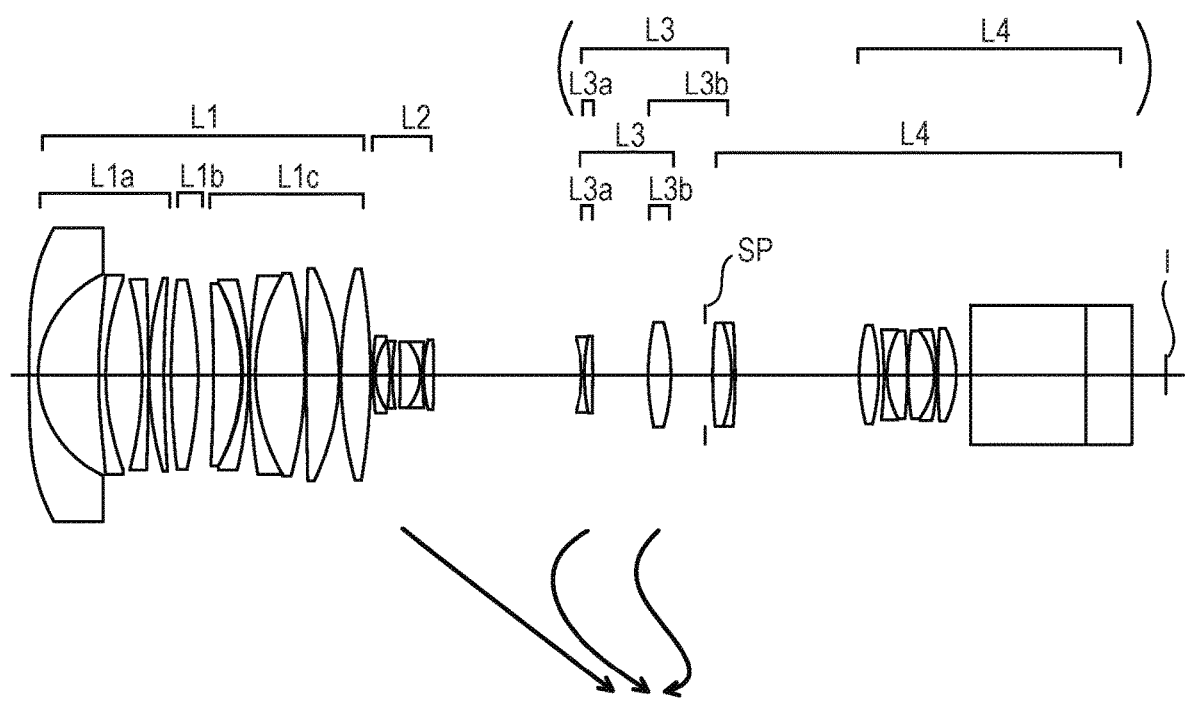
FIG. 7 is a lens sectional view focusing on an infinity object in a wide angle end of numerical embodiment 4.
Figure 8A:
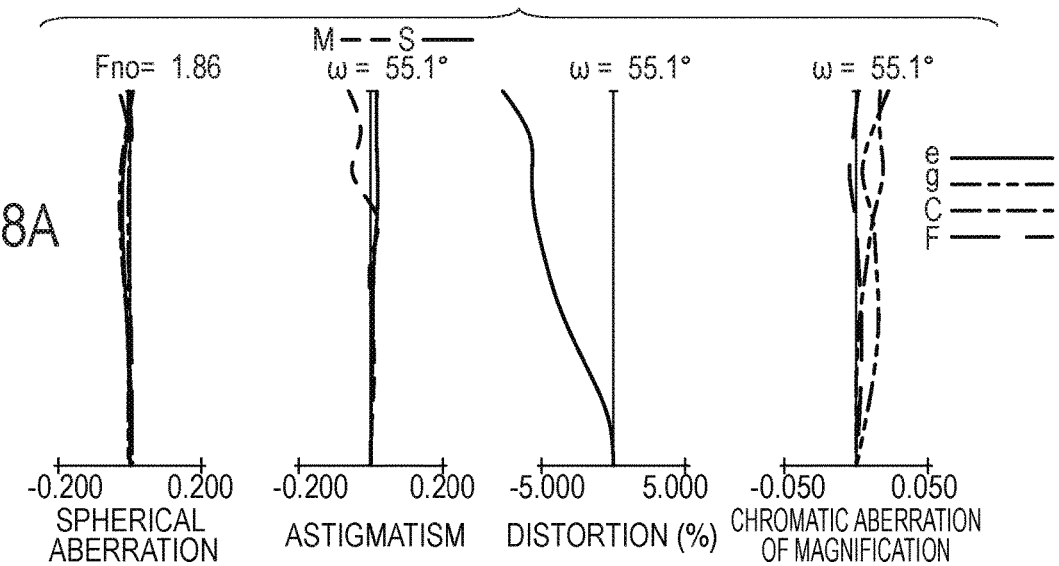
FIG. 8A is an aberration diagram focusing on infinity in the wide angle end of numerical embodiment 4.
Figure 8B:
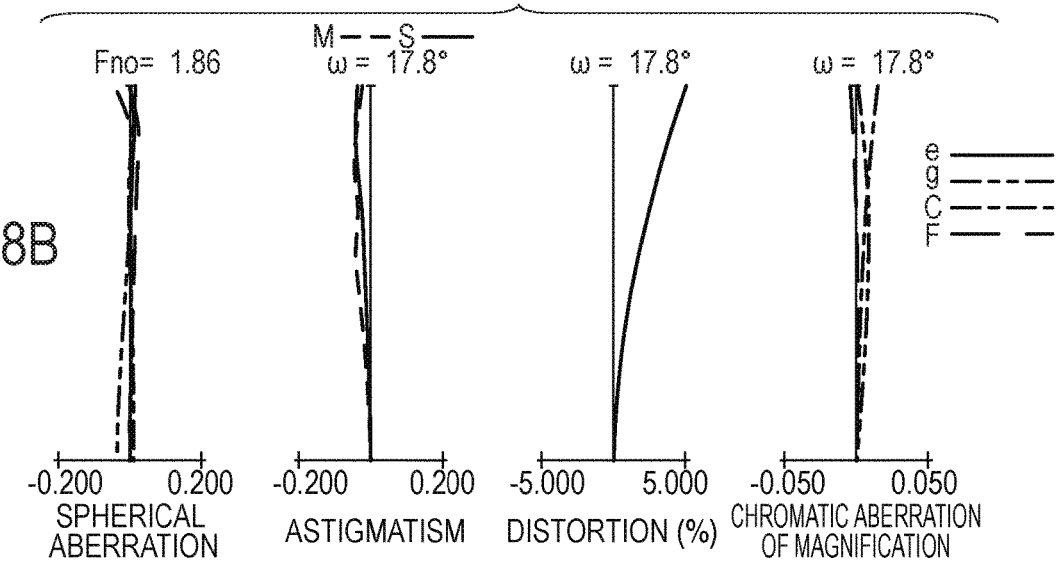
FIG. 8B is an aberration diagram focusing on infinity in a middle of zoom of numerical embodiment 4.
Figure 8C:
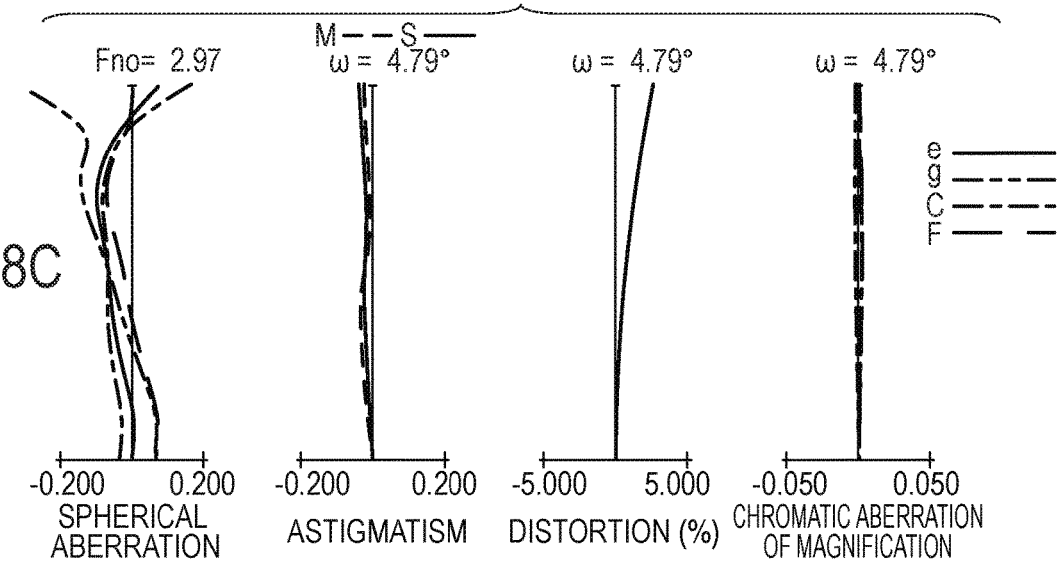
FIG. 8C is an aberration diagram focusing on infinity in a telephoto end of numerical embodiment 4.

FIG. 7 is a lens sectional view focusing on an infinity object in a wide angle end of numerical embodiment 4 as embodiment 4 of the present invention. FIGS. 8A, 8B and 8C are respectively vertical aberration diagrams with focused on an infinity object in a wide angle end, a middle zoom position, a telephoto end (long focal length end) of numerical embodiment 4.

Figure 9:
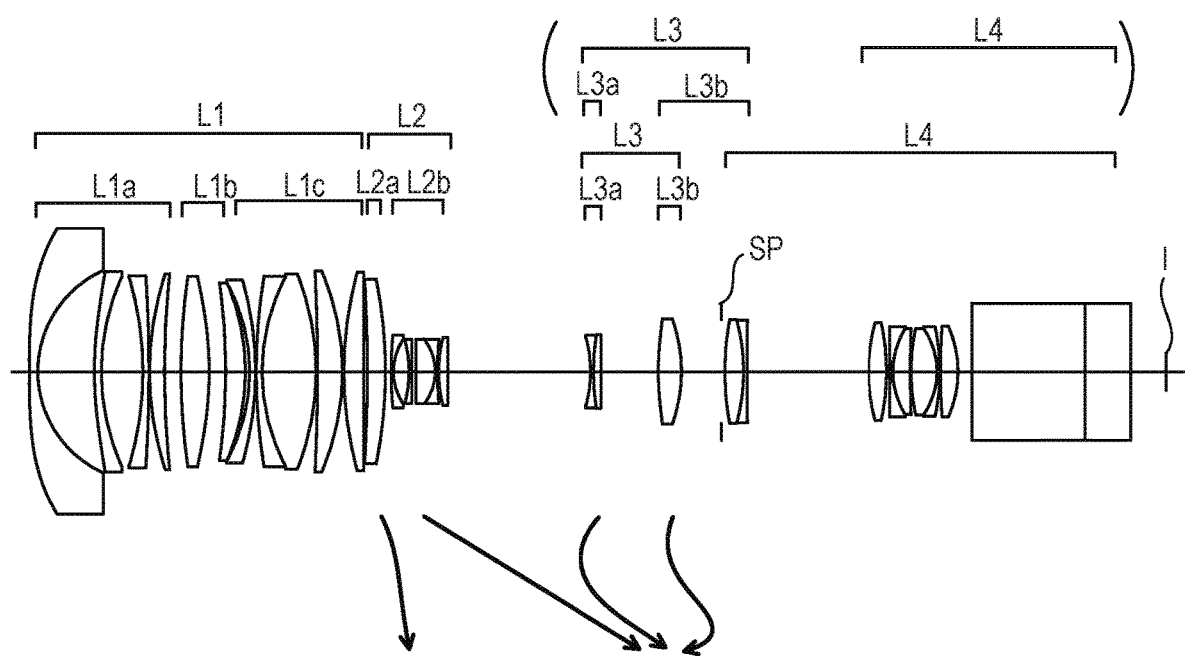
FIG. 9 is a lens sectional view focusing on an infinity object in a wide angle end of numerical embodiment 5.
Figure 10A:
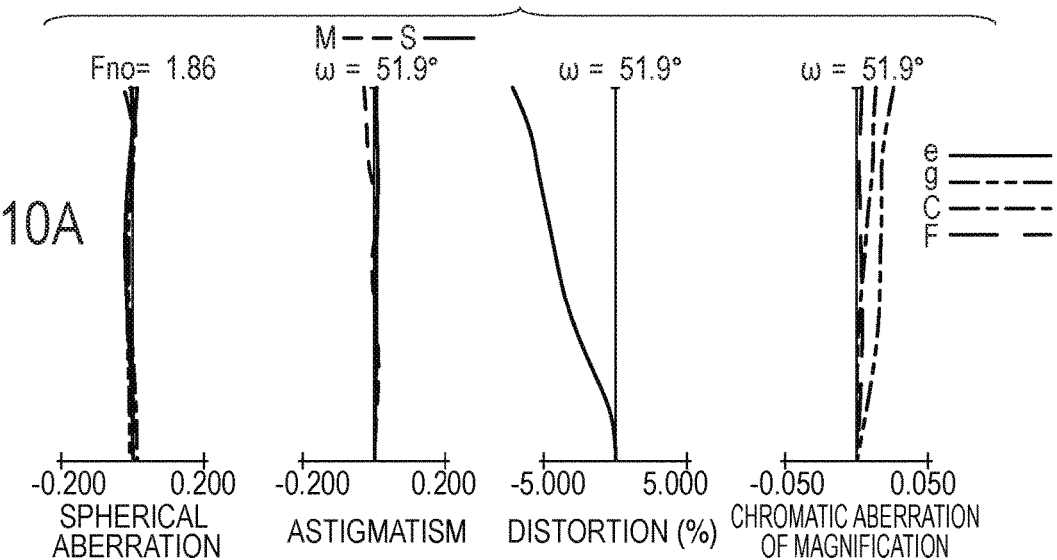
FIG. 10A is an aberration diagram focusing on infinity in the wide angle end of numerical embodiment 5.
Figure 10B:
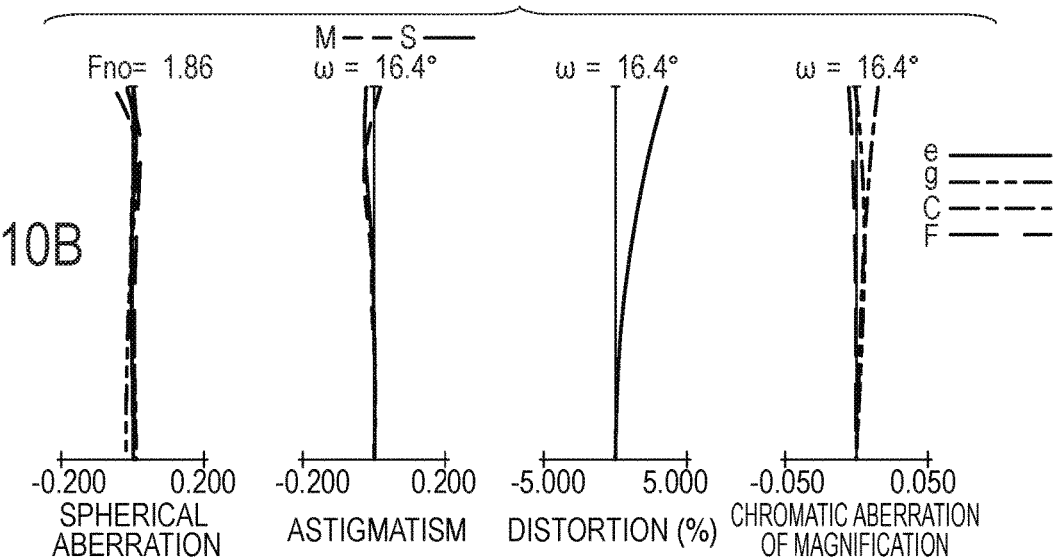
FIG. 10B is an aberration diagram focusing on infinity in a middle of zoom of numerical embodiment 5.
Figure 10C:
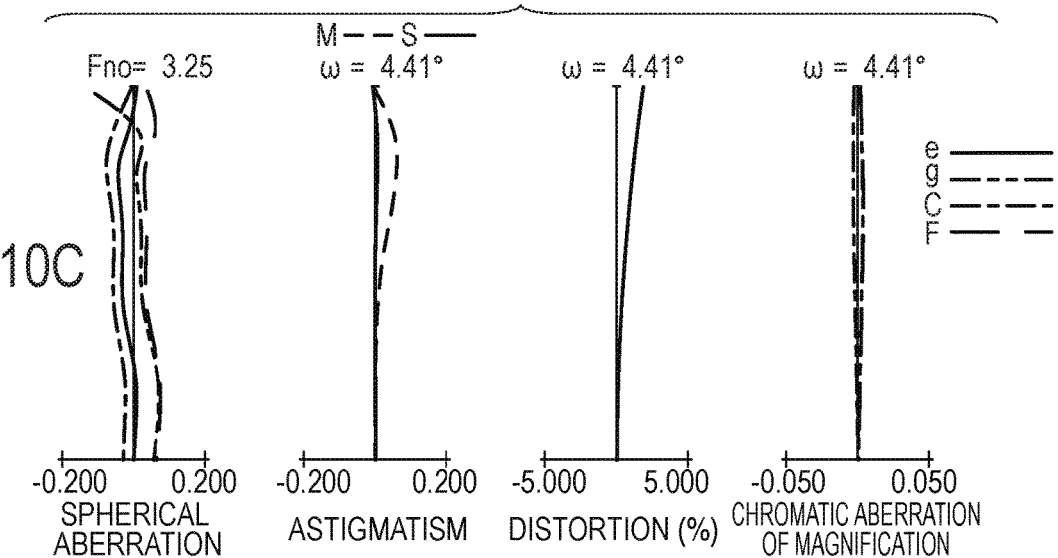
FIG. 10C is an aberration diagram focusing on infinity in a telephoto end of numerical embodiment 5.

FIG. 9 is a lens sectional view focusing on an infinity object in a wide angle end of numerical embodiment 5 as embodiment 5 of the present invention. FIGS. 10A, 10B and 10C are respectively vertical aberration diagrams with focused on an infinity object in a wide angle end, a middle zoom position, and a telephoto end (long focal length end) of numerical embodiment 5.

Figure 11:
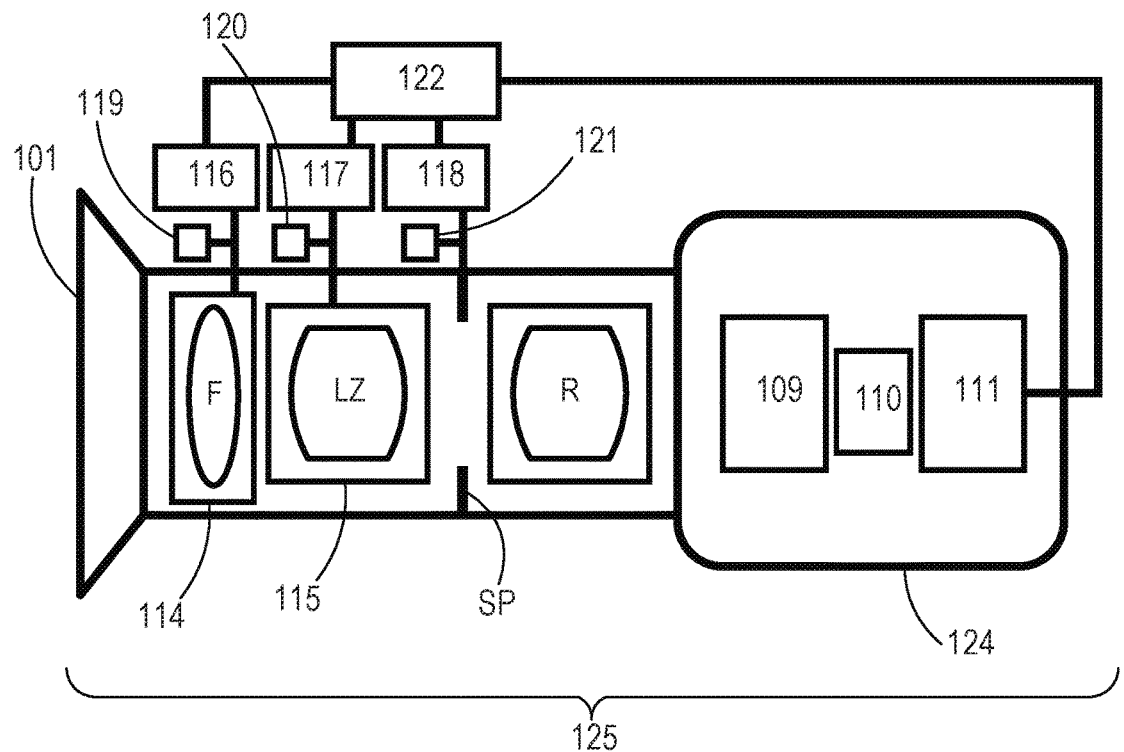
FIG. 11 is a schematic view of a main part of an imaging apparatus of the present invention.

FIG. 11 is a schematic view of a main part of an imaging apparatus of the present invention.

In each of the lens sectional views, a left side is a subject (object) side (front), and a right side is an image side (rear). In the lens sectional views, reference sign L1 denotes a first lens unit that does not move for zooming, and has a positive refractive power. Reference sign L1$b$ denotes a focus lens unit, and moves to the image side in focusing on a close object from an infinite object. Reference signs L1$a$ and L1$c$ denote lens units that do not move for focusing in the first lens unit L1. In FIGS. 1, 3, 5, 7 and 9, reference signs L2 and L3 denote lens units that move for zooming, and reference sign L4 denotes a lens unit that does not move for zooming.

Reference sign SP denotes a stop (aperture stop). Reference sign I denotes an imaging plane, and corresponds to an imaging plane of a solid imaging element (photoelectric conversion element) or the like that receives an image formed by a zoom lens and photoelectrically converts the image, in use as an imaging optical system of a broadcasting TV camera, a movie camera, a video camera, or a digital still camera. Reference sign I corresponds to a film plane on which an image formed by a zoom lens is photosensitized in use as an imaging optical system of a film camera.

In each of the vertical aberration diagrams, a solid line, a two-dot chain line, an alternate long and short dash line and a broken line in spherical aberration are respectively an e-line, a g-line, a C-line and a F-line. A broken line and a solid line in astigmatism respectively show a meridional image plane, and a sagittal image plane, and a two-dot chain line, an alternate long and short dash line and a broken line in chromatic aberration of magnification respectively show the g-line, the C-line and the F-line. Reference signal co denotes a half angle of view, and reference sign Fno denotes an F-number. In each of the following embodiments, a case where the zooming lens unit is disposed at a shortest focal length side is referred to as a wide angle end, and a case where the zooming lens unit is disposed at a longest focal length side is referred to as a telephoto end.

As for scales in the vertical aberration diagrams, spherical aberration is drawn on a scale of 0.2 mm, astigmatism is drawn on a scale of 0.2 mm, distortion is drawn on a scale of 5%, and chromatic aberration of magnification is drawn on a scale of 0.05 mm.

The zoom lens of the present invention includes, in order from the object side to the image side, a positive first lens unit that does not move for zooming, a second lens unit including one or two lens units that monotonously move to the image side for zooming to the telephoto end from the wide angle end with a negative lens unit disposed closest to the image side, and a third lens unit including one to three lens units that move for zooming with a negative lens unit disposed closest to the object side, and a positive fourth lens unit disposed closest to the image side. The first lens unit has a negative 1a lens subunit that does not move for focusing, a positive 1b lens subunit that moves for focusing, and a positive 1c lens subunit that does not move for focusing.

The second lens unit includes at least one negative lens. The following conditional expressions are satisfied:

$$1.0 < |f1/f2t| < 2.5 \quad (1)$$

$$2.0 < |m2/f2t| < 5.0 \quad (2)$$

$$6.5 < \nu 2n \quad (3)$$

where f1 represents A focal length of the first lens unit, f2t represents a composite focal length in a telephoto end of the second lens unit, m2 represents a maximum value of a moving amount for zooming to the telephoto end from the wide angle end of the lens unit included in the second lens unit, and ν2n represents a largest Abbe number in the material forming the negative lens included in the second lens unit.

Here, a sign of moving amount of the second lens unit is positive when the second lens unit moves toward the image plane side.

The first lens unit has a positive refractive power as a whole, and includes the 1a lens subunit that does not move for focusing and has a negative refractive power, the 1b lens subunit that moves for focusing and has a positive refractive power, and the 1c lens subunit that does not move for focusing and has a positive refractive power. The configuration can achieve compactness and a light weight, and high optical performance particularly in a super wide angle to standard zoom lenses.

The second lens unit located at the image side of the first lens unit is a lens unit with the highest contribution to high zoom as a main zoom unit by monotonously moving to the image side for zooming to the telephoto side from the wide angle end.

Next, technical meanings of conditional expressions (1), (2) and (3) will be described.

Conditional expression (1) is an expression defining a ratio of the focal length f1 of the first lens unit, and the composite focal length f2t in the telephoto end of the second lens unit.

When a lower limit condition of the conditional expression (1) is not satisfied, the focal length of the first lens unit becomes too small, and it becomes difficult to achieve high optical performance due to increase in various aberrations that occur in the unit, or the focal length of the second lens unit becomes too large, and it becomes difficult to achieve high zoom and reduction in size and weight.

When an upper limit condition of conditional expression (1) is not satisfied, the focal length of the first lens unit becomes too large, and it becomes difficult to achieve a wide angle and reduction in size and weight, or the focal length of the second lens unit becomes too small, and it becomes difficult to achieve high optical performance by increase in zoom variations in various aberrations.

Conditional expression (2) is an expression defining a ratio of the moving amount m2 from the wide angle end to the telephoto end, that is the largest in second lens unit, and the composite focal length f2t in the telephoto end of the second lens unit.

When a lower limit condition of the conditional expression (2) is not satisfied, the moving amount of the second lens unit becomes too small, and it becomes difficult to achieve high zoom, or the focal length of the second lens unit becomes too large, and it becomes difficult to achieve high zoom and reduction in size and weight.

When an upper limit condition of conditional expression (2) is not satisfied, the moving amount of the second lens unit becomes too large, and it becomes difficult to reduce size and weight, or the focal length of the second lens unit becomes too small, and it becomes difficult to achieve high optical performance due to increase in zoom variations in various aberrations.

Conditional expression (3) defines a numerical range of the Abbe number ν2n of the negative lens with the largest Abbe number in the second lens unit.

Figure 12:
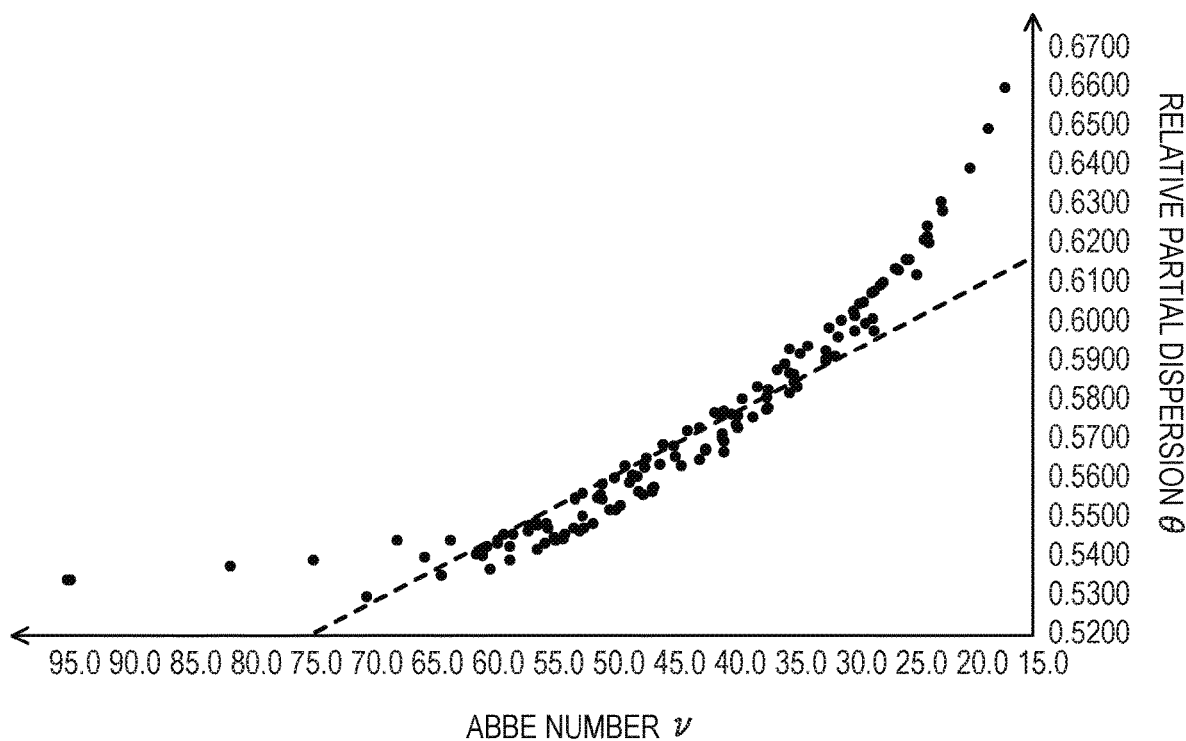
FIG. 12 is a schematic diagram of an Abbe number ν and relative partial dispersion θ distribution of an optical material.

FIG. 12 is a diagram where Abbe number and relative partial dispersion tendency of an optical glass material is plotted. As can be seen from FIG. 12, there is a general tendency that after the Abbe number is approximately 65, the relative partial dispersion deviates from the straight line shown by the broken line, and anomalous dispersion increases.

By applying the material with the above characteristic to the negative lens of the second lens unit that is the main zooming unit dominant in zoom variations in the various aberrations, a zoom variation in the chromatic aberration of magnification can be effectively suppressed.

When a lower limit condition of conditional expression (3) is not satisfied, it becomes difficult to suppress a zoom variation in chromatic aberration of magnification accompanying high zoom, and it becomes difficult to achieve high optical performance.

In each of embodiments, a compact and lightweight zoom lens having a wide angle of view, a high zoom ratio, and high optical performance over an entire zoom range, and an imaging apparatus having the zoom lens can be obtained by being configured as above.

In each of the embodiments, the following various conditions can be further satisfied.

The 1a lens subunit with a negative refractive power has at least one positive lens, and an Abbe number of a positive lens having the smallest Abbe number in the 1a lens subunit is set as ν1ap.

The 1a lens subunit has at least one negative lens, and an average value of refractive indexes in a d-line of the negative lens is set as n1anav.

Average values of the Abbe numbers of the positive lens and the negative lens of the 1a lens subunit are respectively ν1apav and ν1anav, and average values of relative partial dispersions are respectively set as θ1apav and θ1anav.

An Abbe number and a partial dispersion ratio of a positive lens with the smallest Abbe number in the second lens unit are respectively set as ν2p and θ2p, and an Abbe number and a partial dispersion ratio of a negative lens with the largest Abbe number are respectively set as ν2n and θ2n.

A focal length of the 1a lens subunit is set as f1a, a focal length of the 1b lens subunit is set as f1b, and a focal length of the 1c lens subunit is set as f1c.

Focal lengths of an entire lens system in the wide angle end and the telephoto end are respectively set as fw and ft, and a composite focal length of a middle unit in the wide angle end is set as f2w.

At this time, each of the embodiments can satisfy one or more of the following conditional expressions.

$$\nu 1ap < 24 \tag{4}$$

$$1.8 < n1anav \tag{5}$$

$$10.0 < \nu 1anav - \nu 1apav < 35.0 \tag{6}$$

$$-4.5 \times 10^{-3} < (\theta 1apav - \theta 1anav)/(\nu 1apav - \nu 1anav) < -2.0 \times 10^{-3} \tag{7}$$

$$-2.0 \times 10^{-3} < (\theta 2p - \theta 2n)/(\nu 2p - \nu 2n) < -0.5 \times 10^{-3} \tag{8}$$

$$-2.0 < f1a/f1 < -0.3 \tag{9}$$

$$1.5 < f1b/f1 < 6.0 \tag{10}$$

$$1.0 < f1c/f1 < 3.0 \tag{11}$$

$$0.3 < f1/ft < 1.5 \tag{12}$$

$$-7.0 < f2w/fw < -1.5 \tag{13}$$

Note that the Abbe number ν and the relative partial dispersion θ are respectively optical constants that are defined as $$\nu = (nd-1)/(nF-nC)$$

$$\theta = (ng-nF)/(nF-nC)$$

where ng represents a refractive index in the g-line, nF represents a refractive index in the F-line, nd represents a refractive index in the d-line, and nC represents a refractive index in the C-line.

Conditional expression (4) defines a numerical value range of the Abbe number ν1ap of the positive lens with the smallest Abbe number included in the 1a lens subunit of a negative refractive power.

As can be seen from FIG. 12, when the Abbe number decreases, there is also a general tendency that the relative partial dispersion deviates from the straight line shown by the broken line after the Abbe number becomes approximately 25, and anomalous dispersion abruptly increases.

Axial chromatic aberration on a telephoto side can be effectively reduced by applying the material with the above described characteristic to the positive lens included in the 1a lens subunit of a negative refractive power in the first lens unit in which a beam diameter is high in the telephoto end, and aberration is most enlarged by the following units.

When an upper limit condition of the conditional expression (4) is not satisfied, the axial chromatic aberration following high zoom increases, and it becomes difficult to achieve high optical performance.

Conditional expression (5) defines a numerical value range of the average value n1anav of refractive indexes in the d-line of the negative lens included in the 1a lens subunit of the negative refractive power.

When a lower limit condition of conditional expression (5) is not satisfied, distortion aberration and image plane bend in the wide angle end with increase in the wide angle increase, and it becomes difficult to achieve high optical performance.

Conditional expression (6) defines a difference between the average value v1anav of the Abbe numbers of the negative lens included in the 1a lens subunit of the negative refractive power, and the average value v1apav of the Abbe numbers of the positive lens, and defines a primary achromatic condition in the 1a lens subunit.

When a lower limit condition of conditional expression (6) is not satisfied, the difference in Abbe number becomes too small, and single lens refractive power in the unit increases for primary achromatism of the axial chromatic aberration to increase various aberrations, or the axial chromatic aberration is excessively corrected, and it becomes difficult to achieve high optical performance.

When an upper limit condition of conditional expression (6) is not satisfied, the difference in Abbe number becomes too large, so that the axial chromatic aberration is insufficiently corrected, and it becomes difficult to achieve high optical performance.

Conditional expression (7) is an expression using the average value of the Abbe numbers and the average value of the relative partial dispersions of the negative lens and positive lens included in the 1a lens subunit of the negative refractive power, and defines conditions relating to secondary spectrum reduction.

When refractive power of the entire lens unit is $\varphi$, the abbe number is $\nu$ and the relative partial dispersion is $\theta$, and a secondary spectrum amount that is generated is defined as $\Delta$, the secondary spectrum amount $\Delta$ generated is expressed as $$\Delta = (1/\varphi) \cdot (\theta 2 - \theta 1)/(\nu 1 - \nu 2).$$

Here, $\nu 1$ and $\theta 1$ represent optical glass characteristics of the negative (positive) lens, and $\nu 2$ and $\theta 2$ represent optical glass characteristics of the positive (negative) lens.

Accordingly, it can be understood that conditional expression (7) is an expression directly connected to an amount of generation of a secondary spectrum amount.

When a lower limit condition of conditional expression (7) is not satisfied, the difference in Abbe number becomes too small in the existing glass material, and the single lens refractive power in the unit increases due to primary achromatism of the axial chromatic aberration to increase the various aberrations, or the axial chromatic aberration is excessively corrected, so that it becomes difficult to achieve high optical performance.

When an upper limit condition of conditional expression (7) is not satisfied, the axial chromatic aberration secondary spectrum is insufficiently corrected, or the difference in Abbe number becomes too large and the axial chromatic aberration is insufficiently corrected, so that it becomes difficult to achieve high optical performance.

Conditional expression (8) is an expression using the Abbe numbers and the relative partial dispersions of the negative lens with the largest Abbe number and the positive lens with the smallest Abbe number that are included in the second lens unit, and defines the conditions concerning secondary spectrum generation, similarly to conditional expression (7).

In the chromatic aberration of magnification in the zoom lens, a variation to the minus side from the plus side occurs in zooming from the wide angle end to the telephoto end, and it is important to suppress the variation.

By applying the glass material with high anomalous dispersion to the negative lens of the second lens unit that is a main zoom unit, and the glass material with low anomalous dispersion to the positive lens, secondary spectrum generation on a plus side in the wide angle end can be suppressed, and the above described variation can be suppressed.

When a lower limit condition of conditional expression (8) is not satisfied, a suppression effect of a variation in chromatic aberration of magnification becomes insufficient, and it becomes difficult to achieve high optical performance.

When an upper limit condition of conditional expression (8) is not satisfied, the difference in Abbe number becomes too small in the existing glass material, the single lens refractive power in the unit increases for primary achromatism of the axial chromatic aberration to increase the various aberrations, and it becomes difficult to achieve high optical performance.

Conditional expression (9) is an expression that defines a ratio between the focal length f1a of the 1a lens subunit, and the focal length f1 of the first lens unit.

When a lower limit condition of conditional expression (9) is not satisfied, the focal length of the 1a lens subunit becomes too large, and it becomes difficult to achieve a wide angle, or the focal length of the first lens unit becomes too small, and it becomes difficult to achieve high optical performance due to increase in various aberrations that occurs in the unit.

When an upper limit condition of conditional expression (9) is not satisfied, the focal length of the 1a lens subunit becomes too small, and it becomes difficult to achieve high optical performance due to increase in various aberrations that occurs in the unit, or the focal length of the first lens unit becomes too large, and it becomes difficult to reduce size and weight.

Conditional expression (10) is an expression that defines a ratio between the focal length f1b of the 1b lens subunit that moves for focusing and the focal length f1 of the first lens unit.

When a lower limit condition of conditional expression (10) is not satisfied, the focal length of the 1b lens subunit becomes too small, and it becomes difficult to achieve high optical performance due to increase in various aberrations, or the focal length of the first lens unit becomes too large, and it becomes difficult to reduce size and weight.

When an upper limit condition of conditional expression (10) is not satisfied, the focal length of the 1b lens subunit becomes too large, and a moving amount for focusing increases to make it difficult to reduce size and weight, or the focal length of the first lens unit becomes too small, and it becomes difficult to achieve high optical performance due to increase in various aberrations that occurs in the unit.

Conditional expression (11) is an expression that defines a ratio of the focal length f1c of the 1c lens subunit and the focal length f1 of the first lens unit.

When a lower limit condition of conditional expression (11) is not satisfied, the focal length of the 1c lens subunit becomes too small, and it becomes difficult to achieve high optical performance due to increase in various aberrations that occurs in the unit, or the focal length of the first lens unit becomes too large, and it becomes difficult to reduce size and weight.

When an upper limit condition of conditional expression (11) is not satisfied, the focal length of the 1c lens subunit becomes too large, and it becomes difficult to reduce size and weight, or the focal length of the first lens unit becomes too small, and it becomes difficult to achieve high optical performance due to increase in various aberrations that occurs in the unit.

Conditional expression (12) is an expression that defines a ratio of the focal length f1 of the first lens unit, and the entire system focal length ft in the telephoto end.

When a lower limit condition of conditional expression (12) is not satisfied, the focal length of the first lens unit becomes too small, and it becomes difficult to achieve high optical performance due to increase in various aberrations that occurs in the unit.

When an upper limit condition of conditional expression (12) is not satisfied, the focal length of the first lens unit becomes too large, and it becomes difficult to reduce size and weight, or the focal length in the telephoto end becomes insufficient to make high zoom difficult.

Conditional expression (13) is an expression that defines a ratio of the composite focal length f2w of the second lens unit in the wide angle end, and the entire system focal distance fw in the wide angle end.

When a lower limit condition of the conditional expression (13) is not satisfied, the focal length of the second lens unit becomes too large, the moving amount from the wide angle end to the telephoto end increases, and it becomes difficult to reduce size and weight, or it becomes difficult to achieve high optical performance due to increase in various aberrations that occurs in the unit.

When an upper limit condition of conditional expression (13) is not satisfied, the focal length of the second lens unit becomes too small, and it becomes difficult to achieve high optical performance due to increase in zoom variation in various aberrations, or the focal length in the wide angle end becomes insufficient and it becomes difficult to achieve a wide angle.

Note that numerical value ranges of conditional expressions (1) to (13) can be set as follows.

$$1.2 < |f1/f2t| < 2.45 \tag{1a}$$

$$2.1 < |m2/f2t| < 4.0 \tag{2a}$$

$$66 < \nu 2n \tag{3a}$$

$$\nu 1ap < 23.9 \tag{4a}$$

$$1.801 < n1anav \tag{5a}$$

$$13.0 < \nu 1anav - \nu 1apav < 30.0 \tag{6a}$$

$$-4.2 \times 10^{-3} < (\theta 1apav - \theta 1anav)/(\nu 1apav - \nu 1anav) < -2.4 \times 10^{-3} \tag{7a}$$

$$-1.8 \times 10^{-3} < (\theta 2p - \theta 2n)/(\nu 2p - \nu 2n) < -0.8 \times 10^{-3} \tag{8a}$$

$$-1.7 < f1a/f1 < -0.4 \tag{9a}$$

$$1.9 < f1b/f1 < 5.0 \tag{10a}$$

$$1.2 < f1c/f1 < 2.5 \tag{11a}$$

$$0.35 < f1/ft < 1.2 \tag{12a}$$

$$-6.0 < f2w/fw < -2.3 \tag{13a}$$

Note that the numerical value ranges of conditional expressions (1) to (13) can be set as follows.

$$1.45 < |f1/f2t| < 2.40 \tag{1b}$$

$$2.2 < |m2/f2t| < 3.05 \tag{2b}$$

$$67 < \nu 2n \tag{3b}$$

$$\nu 1ap < 23.7 \tag{4b}$$

$$1.802 < n1anav \tag{5b}$$

$$16.0 < \nu 1anav - \nu 1apav < 25.0 \tag{6b}$$

$$-3.9 \times 10^{-3} < (\theta 1apav - \theta 1anav)/(\nu 1apav - \nu 1anav) < -2.8 \times 10^{-3} \tag{7b}$$

$$-1.6 \times 10^{-3} < (\theta 2p - \theta 2n)/(\nu 2p - \nu 2n) < -1.1 \times 10^{-3} \tag{8b}$$

$$-1.4 < f1a/f1 < -0.6 \tag{9b}$$

$$2.3 < f1b/f1 < 4.0 \tag{10b}$$

$$1.5 < f1c/f1 < 1.9 \tag{11b}$$

$$0.4 < f1/ft < 0.8 \tag{12b}$$

$$-4.8 < f2w/fw < -3.0 \tag{13b}$$

Further, the 1b lens subunit has at least one surface including an aspherical surface, and the 1b lens subunit can be in a shape where the refractive power increases from an optical axis to a peripheral portion when applied to the surface with a positive refractive power, and can be in a shape where the refractive power decreases from the optical axis to the peripheral portion when applied to the surface with the negative refractive power.

Since the 1b lens subunit moves for focusing, a smaller moving amount to a close end from infinity is better for reducing the size and weight.

When the aspherical surface having the shape of the characteristic as described above is applied to the 1b lens subunit, spherical aberration and image plane bend on the telephoto side can be suppressed while the moving amount is reduced by having a large refractive power in a paraxial region, and both high optical performance and reduction in size and weight can be achieved.

FIG. 11 is a schematic diagram of a main part of an imaging apparatus (TV camera system) using the zoom lens in any one of embodiments 1 to 5 as an imaging optical system. In FIG. 11, reference sign 101 denotes the zoom lens of any one of embodiments 1 to 5. Reference sign 124 denotes a camera. The zoom lens 101 is attachable to and detachable from the camera 124. Reference sign 125 denotes an imaging apparatus built by attaching the zoom lens 101 to the camera 124. The zoom lens 101 has a first lens unit F, a zoom unit LZ and an $N^{th}$ lens unit R for imaging. The first lens unit F includes a 1b lens subunit L1b for focusing that moves on an optical axis for focusing, and 1a and 1c lens subunits L1a and L1c that do not move for focusing.

The zoom unit LZ includes a moving unit that moves on the optical axis for zooming of embodiments 1 to 5. Reference sign SP denotes an aperture stop. Reference signs 114 and 115 are drive mechanisms such as a helicoid and a cam that respectively drive the 1b lens subunit L1b and the zoom unit LZ in the optical axis direction.

Reference signs 116 to 118 are motors (drive units) that electrically drive the drive mechanisms 114 and 115 and the aperture stop SP. Reference signs 119 to 121 are detectors such as an encoder, a potentiometer or a photosensor for detecting positions on the optical axis of the 1b lens subunit L1b and the zoom unit LZ, and a stop diameter of the aperture stop SP. In the camera 124, reference sign 109 denotes a glass block corresponding to an optical filter in the camera 124. Reference sign 110 is a solid imaging element (photoelectric conversion element) such as a CCD sensor and a CMOS sensor that is disposed on an image plane of the zoom lens 101 and receives a body image formed by the zoom lens 101.

Further, reference signs 111 and 122 are CPUs that control various kinds of drive of the camera 124 and the zoom lens 101. By applying the zoom lens of the present invention to the TV camera in this way, the imaging apparatus having high optical performance is realized.

The exemplary embodiments of the present invention are described thus far, but it goes without saying that the present invention is not limited to these embodiments, and various modifications and changes can be made within the range of the gist of the present invention.

Hereinafter, characteristics of lens configurations of numerical embodiments 1 to 5 of the zoom lens of the present invention will be described. In the lens sectional view of each of the embodiments, reference sign I denotes an image plane, and corresponds to an imaging plane of the solid imaging element. Hereinafter, the lens configuration is described with the zoom lens assumed to be disposed in order from the object side to the image side unless otherwise specified.

Embodiment 1

The zoom lens of the present embodiment includes the first lens unit L1 of a positive refractive power, a 2a lens unit L2a of a negative refractive power, a 2b lens unit L2b of a negative refractive power, a 3a lens unit L3a of a negative refractive power, a 3b lens unit L3b of a positive refractive power, and a fourth lens unit L4 of a positive refractive power. The 2a lens unit L2a and the 2b lens unit L2b configure a second lens unit L2. The 3a lens unit L3a and the 3b lens unit L3b configure a third lens unit L3.

In zooming to a telephoto end from a wide angle end, the first lens unit L1 is immovable to the image plane, and the 2a lens unit L2a and the 2b lens unit L2b monotonously move to the image side for zooming and performs main zooming. The 3a lens unit L3a moves for zooming, and the 3b lens unit L3b performs image plane correction following zooming. The fourth lens unit L4 does not move for zooming.

High optical performance is achieved by the configuration of the positive first lens unit L1 including the 1a lens subunit L1a of a negative refractive power that does not move for focusing, the 1b lens subunit L1b of a positive refractive power that moves for focusing, and the 1c lens subunit L1c of a positive refractive power that does not move for focusing.

A wide angle and high zoom are achieved by properly setting a focal length of the first lens unit L1, a composite focal length of the second lens unit L2, and moving amounts from the wide angle end to the telephoto end of the 2a lens unit L2a and the 2b lens unit L2b.

Further, a glass material with low dispersion and high relative partial dispersion is applied to a negative lens of the 2b lens unit L2b, and zoom variation of chromatic aberration of magnification is favorably corrected.

Values corresponding to respective conditional expressions of the first embodiment are shown in Table 1. The numerical embodiment 1 satisfies all of the conditional expressions, and realizes the zoom lens that is compact and lightweight, and has a wide angle of view, a high zoom ratio, and high optical performance over an entire zoom range.

Embodiment 2

A zoom lens shown in a second embodiment includes a first lens unit L1 of a positive refractive power, a second lens unit L2 of a negative refractive power, a third lens unit L3 of a negative refractive power, and a fourth lens unit L4 of a positive refractive power.

In zooming from a wide angle end to a telephoto end, the first lens unit L1 is immovable to an image plane, the second lens unit L2 monotonously moves to an image side at a zooming time and performs main zooming, and the third lens unit L3 performs image plane correction following zooming. The fourth lens unit L4 does not move for zooming.

High optical performance is achieved by a configuration of the positive first lens unit L1 including a 1a lens subunit L1a of a negative refractive power that does not move for focusing, a 1b lens subunit L1b of a positive refractive power that moves for focusing, and a 1c lens subunit L1c of a positive refractive power that does not move for focusing.

A focal length of the first lens unit L1, a focal length of the second lens unit L2, and a moving amount from a wide angle end to the telephoto end of the second lens unit L2 are properly set, and a wide angle and high zooming are achieved.

Further, a glass material with low dispersion and high relative partial dispersion is applied to a negative lens of the second lens unit L2, and a zoom variation of chromatic aberration of magnification is favorably corrected.

Values corresponding to respective conditional expressions of the second embodiment are shown in Table 1. The numerical embodiment 2 satisfies all of the conditional expressions, and realizes a zoom lens that is compact and lightweight, and has a wide angle of view, a high zoom ratio, and high optical performance over an entire zoom range.

Embodiment 3

A zoom lens shown in a third embodiment includes a first lens unit L1 of a positive refractive power, a second lens unit L2 of a negative refractive power, a 3a lens unit L3a of a negative refractive power, a 3b lens unit L3b of a positive refractive power, and a fourth lens unit L4 of a positive refractive power. A third lens unit L3 includes the 3a lens unit L3a and the 3b lens unit L3b.

In zooming from a wide angle end to a telephoto end, the first lens unit L1 is immovable to an image plane, the second lens unit L2 monotonously moves to an image side at a zooming time and performs main zooming, the 3a lens unit L3a moves for zooming, and the 3b lens unit L3b performs image plane correction following zooming. The fourth lens unit L4 does not move for zooming.

High optical performance is achieved by a configuration of the positive first lens unit L1 including a 1a lens subunit L1a of a negative refractive power that does not move for focusing, a 1b lens subunit L1b of a positive refractive power that moves for focusing, and a 1c lens subunit L1c of a positive refractive power that does not move for focusing.

A focal length of the first lens unit L1, a focal length of the second lens unit L2, and a moving amount from the wide angle end to the telephoto end of the second lens unit L2 are properly set, and a wide angle and high zooming are achieved.

Further, a glass material with low dispersion and high relative partial dispersion is applied to a negative lens of the second lens unit L2, and a zoom variation of chromatic aberration of magnification is favorably corrected.

Values corresponding to respective conditional expressions of the third embodiment are shown in Table 1. The numerical embodiment 3 satisfies all of the conditional expressions, and realizes a zoom lens that is compact and lightweight, and has a wide angle of view, a high zoom ratio, and high optical performance over an entire zoom range.

Embodiment 4

A zoom lens shown in a fourth embodiment includes a first lens unit L1 of a positive refractive power, a second lens unit L2 of a negative refractive power, a 3a lens unit L3a of a negative refractive power, a 3b lens unit L3b of a positive refractive power, and a fourth lens unit L4 of a positive refractive power. The 3a lens unit L3a and the 3b lens unit L3b configure a third lens unit L3.

In zooming from a wide angle end to a telephoto end, the first lens unit L1 is immovable to an image plane, the second lens unit L2 monotonously moves to an image side for zooming and performs main zooming, the 3a lens unit L3a moves for zooming, and the 3b lens unit L3b performs image plane correction following zooming. The fourth lens unit L4 does not move for zooming.

High optical performance is achieved by the configuration of the positive first lens unit L1 including a 1a lens subunit L1a of a negative refractive power that does not move for focusing, a 1b lens subunit L1b of a positive refractive power that moves for focusing, and a 1c lens subunit L1c of a positive refractive power that does not move for focusing.

A wide angle and high zooming are achieved by properly setting a focal length of the first lens unit L1, a focal length of the second lens unit L2, and a moving amount from a wide angle end to a telephoto end of the second lens unit L2.

Further, a glass material with low dispersion and high relative partial dispersion is applied to a negative lens of the second lens unit L2, and zoom variation of chromatic aberration of magnification is favorably corrected.

Values corresponding to respective conditional expressions of the fourth embodiment are shown in Table 1. The numerical embodiment 4 satisfies all of the conditional expressions, and realizes a zoom lens that is compact and lightweight, and has a wide angle of view, a high zoom ratio, and high optical performance over an entire zoom range.

Embodiment 5

A zoom lens of the present embodiment includes a first lens unit L1 of a positive refractive power, a 2a lens unit L2a of a positive refractive power, a 2b lens unit L2b of a negative refractive power, a 3a lens unit L3a of a negative refractive power, a 3b lens unit L3b of a positive refractive power, and a fourth lens unit L4 of a positive refractive power. The 2a lens unit L2a and the 2b lens unit L2b configure the second lens unit L2. The 3a lens unit L3a and the 3b lens unit L3b configure a third lens unit L3.

In zooming from a wide angle end to a telephoto end, the first lens unit L1 is immovable to an image plane, the 2a lens unit L2a moves for zooming, and the 2b lens unit L2b monotonously moves to an image side for zooming to perform main zooming. The 3a lens unit L3a moves for zooming, and the 3b lens unit L3b performs an image plane correction following zooming. The fourth lens unit L4 does not move for zooming.

High optical performance is achieved by a configuration of the positive first lens unit L1 including a 1a lens subunit L1a of a negative refractive power that does not move for focusing, a 1b lens subunit L1b of a positive refractive power that moves for focusing, and a 1c lens subunit L1c of a positive refractive power that does not move for focusing.

A wide angle and high zooming is achieved by properly setting a focal length of the first lens unit L1, a focal length of the second lens unit L2, and a moving amount from a wide angle end to a telephoto end of the 2b lens unit L2b.

Further, a glass material with low dispersion and high relative partial dispersion is applied to a negative lens of the 2b lens unit L2b, and zoom variation of chromatic aberration of magnification is favorably corrected.

Values corresponding to respective conditional expressions of the fifth embodiment are shown in Table 1. The numerical embodiment 5 satisfies all of the conditional expressions, and realizes a zoom lens that is compact and lightweight, and has a wide angle of view, a high zoom ratio, and high optical performance over an entire zoom range.

In the zoom lens of the present invention, a lens unit that is capable of being inserted in and extracted from an optical path and changes a focal length of the entire zoom lens system may be included in the fourth lens unit.

In the numerical embodiment 1 to the numerical embodiment 5, the fourth lens unit is immovable at the time of zooming, but even when the fourth lens unit and a part of the fourth lens unit move, the effect of the present invention is not reduced, and change of moving and not-moving is easy.

For example, in the numerical embodiment 1, a modification in which a surface 30 to a surface 33 that are part at the object side of the fourth lens unit move while drawing a same locus as the locus of the 3b lens unit L3b will be described.

With the above modification, as a cemented lens made up of a surface 31 to the surface 33 move, a relative chromatic aberration correction ability in the middle of zoom particularly increases to reduce zoom variation of the axial chromatic aberration and chromatic aberration of magnification, and therefore higher optical performance is realized. The configuration of the lens unit like this is also applicable similarly to the numerical embodiments 2 to 5, and higher optical performance can be obtained. When the unit configuration is applied to the numerical embodiments 1 to 5, the unit configuration corresponds to the configurations of the third lens units and fourth lens units described in parentheses in FIGS. 1, 3, 5, 7 and 9 respectively.

Further, by moving some of optical members of the fourth lens unit along the optical axis, it becomes possible to give a function of playing a role of back focus adjustment. For example, by making a surface 34 to surface 43 that are part at the object side of the fourth lens unit movable independently in the optical axis direction, a function of playing a role of back focus adjustment can be given. Substantially afocal luminous flux is incident on the surface 34 from the object side, and therefore everything is unchanged except for back focus as a result of the above described plurality of lenses move. Accordingly, the fourth lens unit can play a role as a unit that effectively corrects variation of focus at the time of zooming.

Hereinafter, the numerical embodiments 1 to 5 to the embodiments 1 to 5 of the present invention are shown. In the respective numerical embodiments, reference sign i denotes an order of faces from the object side, and reference sign ri denotes a radius of curvature of an $i^{th}$ surface from the object side. Reference di denotes an interval between the $i^{th}$ surface and a $i+1^{th}$ surface from the object side, and reference signs ndi and vdi denote a refractive index and an Abbe number of an optical member between the $i^{th}$ surface and the $i+1^{th}$ surface. An aspherical surface is shown by attaching an asterisk to the surface number. Correspondences of the respective embodiments and the aforementioned conditional expressions are shown in Table 1.

The aspherical shape is expressed by the following expression where an X-axis is in the optical axis direction, an H-axis is in a perpendicular direction to the optical axis, a light traveling direction is positive, R represents a paraxial radius of curvature, k represents a conical constant, and A3, A4, A5, A6, A7, A8, A9, A10, A11, A12, A13, A14, A15 and A16 are aspherical coefficients. Further, "e-Z" means "$\times 10^{-Z}$".

$$X=(H^2/R)/[1+\{1-(1+k)(H^2/R^2)\}^{0.5}]+A3\cdot H^3+A4\cdot H^4+A5\cdot H^5+A6\cdot H^6+A7\cdot H^7+A8\cdot H^8+A9\cdot H^9+A10\cdot H^{10}+A11\cdot H^{11}+A12\cdot H^{12}+A13\cdot H^{13}+A14\cdot H^{14}+A15\cdot H^{15}+A16\cdot H^{16}$$

Numerical Embodiment 1

Unit mm

Surface data

| Surface number | r | d | nd | vd | θgF |
|---|---|---|---|---|---|
| 1* | 212.531 | 2.70 | 1.83481 | 42.7 | 0.565 |
| 2 | 35.761 | 26.69 | | | |
| 3 | −96.759 | 2.00 | 1.85150 | 40.8 | 0.569 |
| 4 | −309.137 | 0.15 | | | |
| 5 | 101.288 | 4.82 | 1.89286 | 20.4 | 0.639 |
| 6 | 256.658 | 1.29 | | | |
| 7 | 133.986 | 10.12 | 1.59522 | 67.7 | 0.544 |
| 8* | −125.696 | 6.94 | | | |
| 9 | 292.988 | 1.80 | 1.80000 | 29.8 | 0.602 |
| 10 | 48.201 | 13.26 | 1.43875 | 94.7 | 0.534 |
| 11 | −229.927 | 0.40 | | | |
| 12 | 109.122 | 13.41 | 1.43387 | 95.1 | 0.537 |
| 13 | −70.421 | 0.40 | | | |
| 14 | 83.897 | 6.87 | 1.76385 | 48.5 | 0.559 |
| 15 | −5495.256 | (Variable) | | | |
| 16 | 129.990 | 0.70 | 2.00100 | 29.1 | 0.600 |
| 17 | 17.771 | (Variable) | | | |
| 18 | −360.451 | 0.80 | 1.59522 | 67.7 | 0.544 |
| 19 | 33.329 | 2.94 | | | |
| 20 | −79.064 | 5.51 | 1.85478 | 24.8 | 0.612 |
| 21 | −12.457 | 0.70 | 1.88300 | 40.8 | 0.567 |
| 22 | 244.291 | 0.20 | | | |
| 23 | 40.072 | 2.90 | 1.64769 | 33.8 | 0.594 |
| 24 | −142.975 | (Variable) | | | |
| 25 | −32.347 | 0.80 | 1.72916 | 54.7 | 0.544 |
| 26 | 58.424 | 2.31 | 1.84666 | 23.8 | 0.620 |
| 27 | −907.159 | (Variable) | | | |
| 28* | 72.504 | 6.54 | 1.58313 | 59.4 | 0.542 |
| 29 | −46.466 | (Variable) | | | |
| 30(Stop) | ∞ | 1.37 | | | |
| 31 | 172.455 | 5.61 | 1.51742 | 52.4 | 0.556 |
| 32 | −38.794 | 1.00 | 1.85150 | 40.8 | 0.569 |
| 33 | −109.873 | 35.50 | | | |
| 34 | 61.347 | 4.51 | 1.64769 | 33.8 | 0.594 |
| 35 | −80.388 | 0.50 | | | |
| 36 | 129.440 | 0.90 | 1.88300 | 40.8 | 0.567 |
| 37 | 22.619 | 4.90 | 1.49700 | 81.5 | 0.537 |
| 38 | 128.053 | 0.20 | | | |
| 39 | 56.837 | 6.77 | 1.49700 | 81.5 | 0.537 |
| 40 | −25.586 | 0.90 | 2.00100 | 29.1 | 0.600 |
| 41 | −106.423 | 0.70 | | | |
| 42 | 160.219 | 4.87 | 1.48749 | 70.2 | 0.530 |
| 43 | −35.055 | 4.00 | | | |
| 44 | ∞ | 33.00 | 1.60859 | 46.4 | |
| 45 | ∞ | 13.20 | 1.51680 | 64.2 | |
| 46 | ∞ | (Variable) | | | |
| Image plane | ∞ | | | | |

Aspherical surface data

First surface

K = 0.00000e+000 A 4 = 8.50691e−007 A 6 = 7.67858e−010
A 8 = −1.87256e−012 A10 = 2.04087e−015 A12 = −1.18869e−018
A14 = 3.52210e−022 A16 = −4.16301e−026

$8^{th}$ surface

K = 0.00000e+000 A 4 = 8.51072e−007 A 6 = −1.26425e−011
A 8 = −5.09277e−013 A10 = 1.07250e−015 A12 = −1.67422e−018
A14 = 1.31020e−021 A16 = −4.00302e−025

$28^{th}$ surface

K = −1.74464e+001 A 4 = 1.47451e−006 A 6 = −5.06636e−009
A 8 = 5.10980e−012

Various data
Zoom ratio 17.40

| | Wide angle | Middle | Telephoto |
|---|---|---|---|
| Focal length | 5.18 | 21.04 | 90.04 |
| F-number | 1.86 | 1.86 | 3.00 |
| Half angle of view | 46.74 | 14.65 | 3.50 |
| Total lens length | 287.77 | 287.77 | 287.77 |
| BF | 40.62 | 40.62 | 40.62 |
| d15 | 0.79 | 34.35 | 48.73 |
| d17 | 8.20 | 5.03 | 5.28 |
| d24 | 42.29 | 5.04 | 2.91 |
| d27 | 12.29 | 17.57 | 2.11 |
| d29 | 1.60 | 3.18 | 6.14 |
| d46 | 7.45 | 7.45 | 7.45 |

Zoom lens unit data

| Unit | Start surface | Focal length |
|---|---|---|
| 1 | 1 | 37.55 |
| 2a | 16 | −20.46 |
| 2b | 18 | −75.97 |
| 3a | 25 | −51.17 |
| 3b | 28 | 49.37 |
| 4 | 30 | 53.32 |

Numerical Embodiment 2

Unit mm

Surface data

| Surface number | r | d | nd | vd | θgF |
|---|---|---|---|---|---|
| 1* | 424.356 | 2.60 | 1.80400 | 46.5 | 0.558 |
| 2 | 32.015 | 22.17 | | | |
| 3 | −150.714 | 1.90 | 1.80100 | 35.0 | 0.586 |
| 4 | 46.490 | 9.85 | 1.84666 | 23.8 | 0.620 |
| 5 | 375.380 | 1.85 | | | |
| 6 | 211.371 | 6.88 | 1.69680 | 55.5 | 0.543 |
| 7* | −89.873 | 4.30 | | | |

-continued

Unit mm

| | | | | | |
|---|---|---|---|---|---|
| 8 | -249.863 | 12.15 | 1.43875 | 94.7 | 0.534 |
| 9 | -33.192 | 1.80 | 1.89190 | 37.1 | 0.578 |
| 10 | -62.693 | 0.20 | | | |
| 11 | -3225.028 | 1.80 | 1.80100 | 35.0 | 0.586 |
| 12 | 94.879 | 12.61 | 1.43875 | 94.7 | 0.534 |
| 13 | -61.925 | 0.45 | | | |
| 14 | -3263.871 | 7.92 | 1.43387 | 95.1 | 0.537 |
| 15 | -70.161 | 0.45 | | | |
| 16 | 604.467 | 6.79 | 1.76385 | 48.5 | 0.559 |
| 17 | -88.933 | (Variable) | | | |
| 18 | 82.878 | 0.80 | 1.95375 | 32.3 | 0.590 |
| 19 | 16.202 | 4.47 | | | |
| 20 | -36.002 | 0.80 | 1.59522 | 67.7 | 0.544 |
| 21 | 2429.003 | 1.43 | | | |
| 22 | -143.698 | 5.37 | 1.85478 | 24.8 | 0.612 |
| 23 | -13.495 | 0.80 | 1.88300 | 40.8 | 0.567 |
| 24 | 356.628 | 0.20 | | | |
| 25 | 40.759 | 2.68 | 1.65412 | 39.7 | 0.574 |
| 26 | -357.221 | (Variable) | | | |
| 27 | -36.257 | 0.80 | 1.72916 | 54.7 | 0.544 |
| 28 | 59.412 | 2.41 | 1.85478 | 24.8 | 0.612 |
| 29 | -2636.282 | (Variable) | | | |
| 30(Stop) | ∞ | 1.40 | | | |
| 31 | -366.763 | 3.25 | 1.80100 | 35.0 | 0.586 |
| 32 | -47.205 | 0.15 | | | |
| 33 | 161.270 | 2.44 | 1.69680 | 55.5 | 0.543 |
| 34 | -184.027 | 0.15 | | | |
| 35 | 61.733 | 6.17 | 1.53172 | 48.8 | 0.563 |
| 36 | -39.979 | 1.00 | 1.95375 | 32.3 | 0.590 |
| 37 | -1031.875 | 34.30 | | | |
| 38 | 200.913 | 3.69 | 1.67270 | 32.1 | 0.599 |
| 39 | -59.172 | 0.50 | | | |
| 40 | 46.639 | 0.90 | 2.00100 | 29.1 | 0.600 |
| 41 | 22.158 | 8.65 | 1.52249 | 59.8 | 0.544 |
| 42 | -38.666 | 2.23 | | | |
| 43 | -27.303 | 0.90 | 1.88300 | 40.8 | 0.567 |
| 44 | 31.138 | 6.55 | 1.43875 | 94.7 | 0.534 |
| 45 | -47.871 | 0.20 | | | |
| 46 | 54.072 | 8.56 | 1.48749 | 70.2 | 0.530 |
| 47 | -27.368 | 4.00 | | | |
| 48 | ∞ | 33.00 | 1.60859 | 46.4 | |
| 49 | ∞ | 13.20 | 1.51680 | 64.2 | |
| 50 | ∞ | (Variable) | | | |
| Image plane | ∞ | | | | |

Aspherical surface data

First surface

K = 9.44670e+000 A 4 = 4.14768e-006 A 6 = 7.17910e-008
A 8 = 1.35753e-010 A10 = -1.36382e-013 A12 = 6.96080e-017
A14 = 1.86916e-020 A16 = -2.44924e-024
A 3 = -4.22439e-006 A 5 = -5.26324e-007 A 7 = -4.72372e-009
A 9 = 5.73046e-013 A11 = 1.93247e-015 A13 = -2.46055e-018
A15 = 1.81718e-022

Seventh surface

K = -6.04584e-001 A 4 = 3.19512e-006 A 6 = 9.68769e-008
A 8 = 8.05227e-010 A10 = 8.48914e-014 A12 = -3.61830e-015
A14 = -6.24996e-018 A16 = -1.04249e-021
A 3 = -2.03027e-006 A 5 = -4.85589e-007 A 7 = -1.14764e-008
A 9 = -2.93895e-011 A11 = 5.03725e-014 A13 = 1.80143e-016
A15 = 1.24578e-019

Various data
Zoom ratio 12.60

| | Wide angle | Middle | Telephoto |
|---|---|---|---|
| Focal length | 4.65 | 16.51 | 58.59 |
| F-number | 1.86 | 1.86 | 2.67 |
| Half angle of view | 49.79 | 18.43 | 5.36 |
| Total lens length | 296.68 | 296.68 | 296.68 |

-continued

Unit mm

| | | | |
|---|---|---|---|
| BF | 40.62 | 40.62 | 40.62 |
| d17 | 0.85 | 37.39 | 54.27 |
| d26 | 53.90 | 11.57 | 5.76 |
| d29 | 6.77 | 12.57 | 1.50 |
| d50 | 7.45 | 7.45 | 7.45 |

Zoom lens unit data

| Unit | Start surface | Focal length |
|---|---|---|
| 1 | 1 | 32.53 |
| 2 | 18 | -18.66 |
| 3 | 27 | -56.68 |
| 4 | 30 | 65.34 |

Numerical Embodiment 3

Unit mm

Surface data

| Surface number | r | d | nd | vd | θgF |
|---|---|---|---|---|---|
| 1* | 1918.222 | 2.50 | 1.83481 | 42.7 | 0.565 |
| 2 | 30.936 | 17.09 | | | |
| 3* | 159.855 | 2.00 | 1.83481 | 42.7 | 0.565 |
| 4 | 86.331 | 10.04 | | | |
| 5 | -94.827 | 1.80 | 1.83481 | 42.7 | 0.565 |
| 6 | -527.011 | 0.15 | | | |
| 7 | 94.270 | 4.26 | 1.92286 | 18.9 | 0.650 |
| 8 | 347.768 | 1.67 | | | |
| 9* | 164.790 | 8.26 | 1.60300 | 65.4 | 0.540 |
| 10* | -99.054 | 4.41 | | | |
| 11 | -604.301 | 8.00 | 1.43387 | 95.1 | 0.537 |
| 12 | -55.085 | 0.30 | | | |
| 13 | -53.196 | 1.70 | 1.80000 | 29.8 | 0.602 |
| 14 | -110.385 | 0.18 | | | |
| 15 | 169.977 | 1.70 | 1.91650 | 31.6 | 0.591 |
| 16 | 53.615 | 13.56 | 1.43875 | 94.7 | 0.534 |
| 17 | -122.220 | 0.40 | | | |
| 18 | 861.296 | 9.06 | 1.43387 | 95.1 | 0.537 |
| 19 | -67.470 | 0.40 | | | |
| 20 | 111.203 | 8.23 | 1.76385 | 48.5 | 0.559 |
| 21 | -166.639 | (Variable) | | | |
| 22 | 96.566 | 0.70 | 2.00100 | 29.1 | 0.600 |
| 23 | 17.507 | 4.07 | | | |
| 24 | -61.457 | 0.70 | 1.43875 | 94.7 | 0.534 |
| 25 | 70.548 | 2.33 | | | |
| 26 | -109.228 | 5.39 | 1.85478 | 24.8 | 0.612 |
| 27 | -14.852 | 0.70 | 1.88300 | 40.8 | 0.567 |
| 28 | 171.286 | 0.21 | | | |
| 29 | 40.389 | 3.04 | 1.64769 | 33.8 | 0.594 |
| 30 | -122.593 | (Variable) | | | |
| 31 | -32.417 | 0.80 | 1.72916 | 54.7 | 0.544 |
| 32 | 45.308 | 2.57 | 1.84666 | 23.8 | 0.620 |
| 33 | 1466.077 | (Variable) | | | |
| 34* | 66.039 | 6.29 | 1.58913 | 61.1 | 0.541 |
| 35 | -54.493 | (Variable) | | | |
| 36(Stop) | ∞ | 1.84 | | | |
| 37 | 122.970 | 5.35 | 1.51742 | 52.4 | 0.556 |
| 38 | -46.108 | 1.00 | 1.83481 | 42.7 | 0.565 |
| 39 | -164.538 | 35.50 | | | |
| 40 | 61.903 | 5.47 | 1.63980 | 34.5 | 0.592 |
| 41 | -51.062 | 1.55 | | | |
| 42 | -91.972 | 0.90 | 1.88300 | 40.8 | 0.567 |
| 43 | 27.882 | 5.27 | 1.48749 | 70.2 | 0.530 |
| 44 | -141.929 | 0.20 | | | |

-continued

Unit mm

| 45 | 61.770 | 7.82 | 1.43875 | 94.7 | 0.534 |
| 46 | −21.051 | 0.90 | 2.00100 | 29.1 | 0.600 |
| 47 | −54.423 | 0.13 | | | |
| 48 | 141.825 | 5.35 | 1.48749 | 70.2 | 0.530 |
| 49 | −31.912 | 4.00 | | | |
| 50 | ∞ | 33.00 | 1.60859 | 46.4 | |
| 51 | ∞ | 13.20 | 1.51680 | 64.2 | |
| 52 | ∞ | (Variable) | | | |
| Image plane | ∞ | | | | |

Aspherical surface data

First surface

K = 0.00000e+000 A 4 = 3.89922e−006 A 6 = 1.07694e−008
A 8 = 7.79026e−012 A10 = 9.49367e−014 A12 = 1.11174e−016
A14 = 1.85192e−020 A16 = −6.14971e−026
A 3 = 1.60188e−005 A 5 = −1.68458e−007 A 7 = −3.06230e−010
A 9 = −1.17457e−012 A11 = −4.11466e−015 A13 = −1.90016e−018
A15 = −7.32479e−023

Third surface

K = 0.00000e+000 A 4 = −2.18327e−006 A 6 = −7.46601e−008
A 8 = −7.11385e−010 A10 = −3.23420e−013 A12 = 1.59786e−015
A14 = −6.51605e−019 A16 = −2.04040e−022
A 3 = −1.28010e−005 A 5 = 4.37046e−007 A 7 = 9.13598e−009
A 9 = 3.03267e−011 A11 = −3.27268e−014 A13 = −1.78219e−017
A15 = 2.23023e−020

$10^{th}$ surface

K = 0.00000e+000 A 4 = 1.08070e−006 A 6 = 1.37549e−008
A 8 = 2.71473e−010 A10 = 2.08368e−013 A12 = −7.68841e−016
A14 = 1.05285e−018 A16 = 2.18705e−022
A 3 = −3.60136e−006 A 5 = −1.77292e−008 A 7 = −2.66936e−009
A 9 = −1.44188e−011 A11 = 1.68104e−014 A13 = −4.82004e−018
A15 = −2.64010e−020

$34^{th}$ surface

K = −1.32879e+001 A 4 = 1.73777e−006 A 6 = −4.65336e−009
A 8 = 2.82343e−012

Various data
Zoom ratio 13.60

| | Wide angle | Middle | Telephoto |
|---|---|---|---|
| Focal length | 4.43 | 16.45 | 60.25 |
| F-number | 1.86 | 1.86 | 2.78 |
| Half angle of view | 51.15 | 18.49 | 5.22 |
| Total lens length | 298.62 | 298.62 | 298.62 |
| BF | 40.62 | 40.62 | 40.62 |
| d21 | 0.65 | 37.09 | 52.71 |
| d30 | 40.88 | 4.91 | 4.40 |
| d33 | 14.36 | 17.47 | 2.11 |
| d35 | 8.35 | 4.77 | 5.02 |
| d52 | 7.45 | 7.45 | 7.45 |

Zoom lens unit data

| Unit | Start surface | Focal length |
|---|---|---|
| 1 | 1 | 29.69 |
| 2 | 22 | −20.23 |
| 3a | 31 | −48.88 |
| 3b | 34 | 51.48 |
| 4 | 36 | 53.03 |

Numerical Embodiment 4

Unit mm

Surface data

| Surface number | r | d | nd | vd | θgF |
|---|---|---|---|---|---|
| 1* | −2440.056 | 2.50 | 1.83481 | 42.7 | 0.565 |
| 2 | 31.805 | 17.32 | | | |
| 3* | 149.046 | 2.00 | 1.83481 | 42.7 | 0.565 |
| 4 | 76.892 | 10.51 | | | |
| 5 | −106.503 | 1.75 | 1.89190 | 37.1 | 0.578 |
| 6 | −701.504 | 0.15 | | | |
| 7 | 96.907 | 4.26 | 1.95906 | 17.5 | 0.660 |
| 8 | 354.199 | 2.00 | | | |
| 9 | 200.819 | 7.84 | 1.59522 | 67.7 | 0.544 |
| 10* | −102.442 | 4.41 | | | |
| 11 | −441.091 | 8.07 | 1.43387 | 95.1 | 0.537 |
| 12 | −54.784 | 0.34 | | | |
| 13 | −52.604 | 1.70 | 1.75520 | 27.5 | 0.610 |
| 14 | −112.274 | 0.18 | | | |
| 15 | 172.755 | 1.70 | 1.91650 | 31.6 | 0.591 |
| 16 | 56.670 | 14.35 | 1.43875 | 94.7 | 0.534 |
| 17 | −108.571 | 0.40 | | | |
| 18 | 1049.793 | 9.46 | 1.43387 | 95.1 | 0.537 |
| 19 | −68.289 | 0.40 | | | |
| 20 | 113.998 | 8.57 | 1.76385 | 48.5 | 0.559 |
| 21 | −173.194 | (Variable) | | | |
| 22 | 86.514 | 0.70 | 2.00100 | 29.1 | 0.600 |
| 23 | 17.319 | 4.15 | | | |
| 24 | −67.204 | 0.70 | 1.43875 | 94.7 | 0.534 |
| 25 | 58.617 | 2.31 | | | |
| 26 | −183.166 | 5.73 | 1.85478 | 24.8 | 0.612 |
| 27 | −14.517 | 0.65 | 1.88300 | 40.8 | 0.567 |
| 28 | 122.213 | 0.21 | | | |
| 29 | 37.048 | 2.97 | 1.64769 | 33.8 | 0.594 |
| 30 | −233.512 | (Variable) | | | |
| 31 | −33.485 | 0.75 | 1.72916 | 54.7 | 0.544 |
| 32 | 52.080 | 2.45 | 1.84666 | 23.8 | 0.620 |
| 33 | −2211.841 | (Variable) | | | |
| 34* | 64.235 | 6.57 | 1.58913 | 61.1 | 0.541 |
| 35 | −54.423 | (Variable) | | | |
| 36(Stop) | ∞ | 2.07 | | | |
| 37 | 146.474 | 5.48 | 1.51742 | 52.4 | 0.556 |
| 38 | −45.128 | 1.00 | 1.83481 | 42.7 | 0.565 |
| 39 | −186.320 | 35.49 | | | |
| 40 | 54.214 | 5.80 | 1.63980 | 34.5 | 0.592 |
| 41 | −55.141 | 1.50 | | | |
| 42 | −110.898 | 0.85 | 1.88300 | 40.8 | 0.567 |
| 43 | 26.795 | 5.81 | 1.48749 | 70.2 | 0.530 |
| 44 | −120.522 | 0.20 | | | |
| 45 | 77.533 | 7.56 | 1.43875 | 94.7 | 0.534 |
| 46 | −20.849 | 0.85 | 2.00100 | 29.1 | 0.600 |
| 47 | −56.507 | 0.13 | | | |
| 48 | 181.513 | 5.35 | 1.48749 | 70.2 | 0.530 |
| 49 | −30.620 | 4.00 | | | |
| 50 | ∞ | 33.00 | 1.60859 | 46.4 | |
| 51 | ∞ | 13.20 | 1.51680 | 64.2 | |
| 52 | ∞ | (Variable) | | | |
| Image plane | ∞ | | | | |

Aspherical surface data

First surface

K = 0.00000e+000 A 4 = 4.76599e−006 A 6 = 2.34876e−008
A 8 = 3.32114e−011 A10 = 1.08361e−013 A12 = 1.45131e−016
A14 = 5.37314e−022 A16 = −1.88075e−024
A 3 = 8.53759e−006 A 5 = −2.91957e−007 A 7 = −1.09456e−009
A 9 = −1.52308e−012 A11 = −5.29333e−015 A13 = −1.88364e−018
A15 = 2.49247e−022

Third surface

K = 0.00000e+000 A 4 = −2.13576e−006 A 6 = −5.67472e−008
A 8 = −5.37801e−010 A10 = −1.96389e−013 A12 = 1.85283e−015
A14 = −3.01329e−019 A16 = −2.20403e−022
A 3 = −3.60251e−006 A 5 = 3.56225e−007 A 7 = 6.89385e−009

-continued

Unit mm

A 9 = 2.29023e−011 A11 = −3.37819e−014 A13 = −3.37814e−017
A15 = 2.03629e−020
$10^{th}$ surface K = 0.00000e+000 A 4 = 7.74130e−007 A 6 = 3.72970e−009
A 8 = 2.38598e−010 A10 = 4.29430e−013 A12 = −7.21051e−016
A14 = 8.28730e−019 A16 = 2.10538e−022
A 3 = 4.29253e−009 A 5 = 4.39822e−008 A 7 = −1.74984e−009
A 9 = −1.60309e−011 A11 = 8.20870e−015 A13 = 1.99888e−018
A15 = −2.37790e−020
$34^{th}$ surface K = −1.02237e+001 A 4 = 8.99481e−007 A 6 = −2.52712e−009
A 8 = 6.95575e−013

Various data
Zoom ratio 15.40

|  | Wide angle | Middle | Telephoto |
|---|---|---|---|
| Focal length | 4.15 | 16.33 | 63.92 |
| F-number | 1.86 | 1.86 | 2.97 |
| Half angle of view | 52.96 | 18.61 | 4.92 |
| Total lens length | 306.62 | 306.62 | 306.62 |
| BF | 40.62 | 40.62 | 40.62 |
| d21 | 0.64 | 39.50 | 55.37 |
| d30 | 42.49 | 3.91 | 3.28 |
| d33 | 15.87 | 19.96 | 2.10 |
| d35 | 9.80 | 5.44 | 8.05 |
| d52 | 7.45 | 7.45 | 7.45 |

Zoom lens unit data

| Unit | Start surface | Focal length |
|---|---|---|
| 1 | 1 | 29.21 |
| 2 | 22 | −19.70 |
| 3a | 31 | −52.38 |
| 3b | 34 | 50.86 |
| 4 | 36 | 54.08 |

Numerical Embodiment 5

Unit mm

Surface data

| Surface number | r | d | nd | vd | θgF |
|---|---|---|---|---|---|
| 1* | 381.375 | 2.50 | 1.83481 | 42.7 | 0.565 |
| 2 | 32.515 | 16.52 |  |  |  |
| 3* | 112.526 | 2.00 | 1.83481 | 42.7 | 0.565 |
| 4 | 67.517 | 12.14 |  |  |  |
| 5 | −95.754 | 1.75 | 1.89190 | 37.1 | 0.578 |
| 6 | −416.656 | 0.15 |  |  |  |
| 7 | 91.721 | 4.32 | 1.95906 | 17.5 | 0.660 |
| 8 | 263.393 | 4.84 |  |  |  |
| 9 | 197.012 | 8.18 | 1.59522 | 67.7 | 0.544 |
| 10* | −103.635 | 4.89 |  |  |  |
| 11 | −180.228 | 5.69 | 1.43387 | 95.1 | 0.537 |
| 12 | −65.497 | 1.26 |  |  |  |
| 13 | −54.143 | 1.70 | 1.75520 | 27.5 | 0.610 |
| 14 | −94.831 | 0.18 |  |  |  |
| 15 | 170.296 | 1.70 | 1.91650 | 31.6 | 0.591 |
| 16 | 59.538 | 15.93 | 1.43875 | 94.7 | 0.534 |
| 17 | −77.142 | 0.40 |  |  |  |
| 18 | −588.801 | 7.27 | 1.43387 | 95.1 | 0.537 |
| 19 | −73.827 | 0.40 |  |  |  |
| 20 | 109.341 | 5.85 | 1.76385 | 48.5 | 0.559 |
| 21 | −3274.403 | (Variable) |  |  |  |
| 22 | −478.512 | 5.28 | 1.59522 | 67.7 | 0.544 |
| 23 | −135.386 | (Variable) |  |  |  |
| 24 | 112.166 | 0.70 | 2.00100 | 29.1 | 0.600 |
| 25 | 17.077 | 4.58 |  |  |  |
| 26 | −33.336 | 0.70 | 1.43875 | 94.7 | 0.534 |
| 27 | 1254.880 | 1.32 |  |  |  |
| 28 | 3966.226 | 5.61 | 1.85478 | 24.8 | 0.612 |
| 29 | −15.229 | 0.65 | 1.88300 | 40.8 | 0.567 |
| 30 | 118.389 | 0.21 |  |  |  |
| 31 | 36.534 | 2.77 | 1.64769 | 33.8 | 0.594 |
| 32 | −1030.026 | (Variable) |  |  |  |
| 33 | −34.322 | 0.75 | 1.72916 | 54.7 | 0.544 |
| 34 | 64.399 | 2.27 | 1.84666 | 23.8 | 0.620 |
| 35 | −561.529 | (Variable) |  |  |  |
| 36* | 87.493 | 6.73 | 1.58913 | 61.1 | 0.541 |
| 37 | −44.947 | (Variable) |  |  |  |
| 38(Stop) | ∞ | 1.00 |  |  |  |
| 39 | 77.471 | 5.53 | 1.51742 | 52.4 | 0.556 |
| 40 | −58.107 | 1.00 | 1.83481 | 42.7 | 0.565 |
| 41 | 868.968 | 35.50 |  |  |  |
| 42 | 52.707 | 5.33 | 1.63980 | 34.5 | 0.592 |
| 43 | −63.588 | 0.96 |  |  |  |
| 44 | −758.337 | 0.85 | 1.88300 | 40.8 | 0.567 |
| 45 | 23.797 | 5.06 | 1.48749 | 70.2 | 0.530 |
| 46 | 323.412 | 0.20 |  |  |  |
| 47 | 57.907 | 7.60 | 1.43875 | 94.7 | 0.534 |
| 48 | −22.073 | 0.85 | 2.00100 | 29.1 | 0.600 |
| 49 | −59.606 | 0.13 |  |  |  |
| 50 | 168.855 | 5.13 | 1.48749 | 70.2 | 0.530 |
| 51 | −32.559 | 4.00 |  |  |  |
| 52 | ∞ | 33.00 | 1.60859 | 46.4 |  |
| 53 | ∞ | 13.20 | 1.51680 | 64.2 |  |
| 54 | ∞ | (Variable) |  |  |  |
| Image plane | ∞ |  |  |  |  |

Aspherical surface data

First surface

K = 0.00000e+000 A 4 = 2.01908e−006 A 6 = 4.23993e−008
A 8 = 6.53476e−011 A10 = 7.31332e−014 A12 = 1.17047e−016
A14 = 3.35077e−021 A16 = −1.48782e−024
A 3 = 2.00416e−005 A 5 = −3.54513e−007 A 7 = −2.25048e−009
A 9 = −1.52261e−012 A11 = −3.86937e−015 A13 = −1.68068e−018
A15 = 1.81568e−022
Third surface K = 0.00000e+000 A 4 = −3.50109e−007 A 6 = −4.86051e−008
A 8 = −6.30720e−010 A10 = −2.00734e−012 A12 = −6.05939e−016
A14 = 1.42606e−018 A16 = 1.65847e−022
A 3 = −1.92790e−005 A 5 = 2.58082e−007 A 7 = 6.50104e−009
A 9 = 4.26422e−011 A11 = 5.97297e−014 A13 = −3.04509e−017
A15 = −2.49033e−020
$10^{th}$ surface K = 0.00000e+000 A 4 = 1.17993e−006 A 6 = 1.21930e−008
A 8 = 2.05982e−010 A10 = 1.92256e−013 A12 = −7.38032e−017
A14 = 1.42896e−018 A16 = 2.37468e−022
A 3 = −4.57624e−006 A 5 = −4.47262e−008 A 7 = −2.08040e−009
A 9 = −1.08908e−011 A11 = 6.37488e−015 A13 = −2.66989e−017
A15 = −3.00141e−020
$36^{th}$ surface K = −4.09012e+000 A 4 = −2.80012e−006 A 6 = 7.91996e−010
A 8 = −6.34450e−013

Various data
Zoom ratio 15.05

|  | Wide angle | Middle | Telephoto |
|---|---|---|---|
| Focal length | 4.65 | 18.03 | 70.00 |
| F-number | 1.86 | 1.86 | 3.25 |
| Half angle of | 49.79 | 16.96 | 4.49 |

-continued

| Unit mm | | | |
|---|---|---|---|
| view | | | |
| Total lens length | 311.62 | 311.62 | 311.62 |
| BF | 40.62 | 40.62 | 40.62 |
| d21 | 1.00 | 6.52 | 8.06 |
| d23 | 1.63 | 36.14 | 50.55 |
| d32 | 41.80 | 4.73 | 3.13 |
| d35 | 16.65 | 20.86 | 2.10 |
| d37 | 11.57 | 4.40 | 8.80 |
| d54 | 7.45 | 7.45 | 7.45 |

| Zoom lens unit data | | |
|---|---|---|
| Unit | Start surface | Focal length |
| 1 | 1 | 40.26 |
| 2a | 22 | 314.28 |
| 2b | 24 | −19.53 |
| 3a | 33 | −56.05 |
| 3b | 36 | 51.17 |
| 4 | 38 | 55.57 |

TABLE 1

Values corresponding to respective conditional expressions in numerical embodiments 1 to 5

| No. | Conditional expression | Embodiment 1 | Embodiment 2 | Embodiment 3 | Embodiment 4 | Embodiment 5 |
|---|---|---|---|---|---|---|
| (1) | $|f1/f2t|$ | 2.332 | 1.749 | 1.467 | 1.489 | 1.612 |
| (2) | $|m2/f2t|$ | 2.967 | 2.863 | 2.573 | 2.779 | 2.242 |
| (3) | $\nu 2n$ | 67.7 | 67.7 | 94.7 | 94.7 | 94.7 |
| (4) | $\nu 1ap$ | 20.4 | 23.8 | 18.9 | 17.5 | 17.5 |
| (5) | $n1anav$ | 1.84316 | 1.80250 | 1.83481 | 1.85384 | 1.85384 |
| (6) | $\nu 1anav - \nu 1apav$ | 21.4 | 17.0 | 23.8 | 23.4 | 23.4 |
| (7) | $(\theta 1apav - \theta 1anav)/(\nu 1apav - \nu 1anav)$ | −3.37E−03 | −2.86E−03 | −3.55E−03 | −3.87E−03 | −3.87E−03 |
| (8) | $(\theta 2p - \theta 2n)/(\nu 2p - \nu 2n)$ | −1.58E−03 | −1.58E−03 | −1.12E−03 | −1.12E−03 | −1.12E−03 |
| (9) | $f1a/f1$ | −1.315 | −0.915 | −1.016 | −1.001 | −0.803 |
| (10) | $f1b/f1$ | 2.934 | 2.799 | 3.485 | 3.924 | 2.853 |
| (11) | $f1c/f1$ | 1.543 | 1.614 | 1.819 | 1.826 | 1.692 |
| (12) | $f1/ft$ | 0.419 | 0.557 | 0.493 | 0.459 | 0.575 |
| (13) | $f2w/fw$ | −3.028 | −4.012 | −4.567 | −4.748 | −4.478 |
| | fw | 5.18 | 4.65 | 4.43 | 4.15 | 4.65 |
| | ft | 90.01 | 58.58 | 60.25 | 63.95 | 70.00 |
| | f1 | 37.68 | 32.64 | 29.69 | 29.33 | 40.26 |
| | f2w | −15.68 | −18.66 | −20.23 | −19.69 | −20.82 |
| | f2t | −16.16 | −18.66 | −20.23 | −19.69 | −24.97 |
| | f1a | −49.57 | −29.85 | −30.17 | −29.35 | −32.34 |
| | f1b | 110.57 | 91.36 | 103.45 | 115.08 | 114.86 |
| | f1c | 58.13 | 52.67 | 54.00 | 53.54 | 68.10 |
| | m2 | 47.94 | 53.41 | 52.06 | 54.73 | 55.98 |
| | n1anav | 1.84316 | 1.80250 | 1.83481 | 1.85384 | 1.85384 |
| | $\nu 1ap$ | 20.4 | 23.8 | 18.9 | 17.5 | 17.5 |
| | $\nu 1apav$ | 20.4 | 23.8 | 18.9 | 17.5 | 17.5 |
| | $\theta 1apav$ | 0.639 | 0.621 | 0.650 | 0.660 | 0.660 |
| | $\nu 1anav$ | 41.8 | 40.8 | 42.7 | 40.9 | 40.9 |
| | $\theta 1anav$ | 0.567 | 0.572 | 0.565 | 0.569 | 0.569 |
| | $\nu 2p$ | 24.8 | 24.8 | 24.8 | 24.8 | 24.8 |
| | $\theta 2p$ | 0.612 | 0.612 | 0.612 | 0.612 | 0.612 |
| | $\nu 2n$ | 67.7 | 67.7 | 94.7 | 94.7 | 94.7 |
| | $\theta 2n$ | 0.544 | 0.544 | 0.534 | 0.534 | 0.534 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-030905, filed Feb. 22, 2019, which is hereby incorporated by reference herein in its entirety.

What is claimed is:

1. A zoom lens comprising in order from an object side to an image side:
    a first lens unit having a positive refractive power and configured not to be moved for zooming;
    one or two second lens units including a lens unit closest to the image side and having a negative refractive power, the one or two second lens units configured to be monotonously moved to the image side for zooming from a wide angle end to a telephoto end;
    one or two third lens units including a lens unit closest to the object side and having a negative refractive power, the one or two third lens units configured to be moved for zooming; and
    a fourth lens unit closest to the image side and having a positive refractive power,
    wherein the first lens unit comprises, in order from the object side to the image side, a 1a lens subunit having a negative refractive power and configured not to be moved for focusing, a 1b lens subunit having a positive refractive power and configured to be moved for focusing, and a 1c lens subunit having a positive refractive power and configured not to be moved for focusing,
    wherein conditional expressions $1.0<|f1/f2t|<2.5$, $2.0<|m2/f2t|<5.0$, $65<\nu 2n$, and $1.8<n1anav$ are satisfied where f1 represents a focal length of the first lens unit, f2t represents a composite focal length at the telephoto end of the one or two second lens units, m2 represents a maximum moving amount of at least one moving amount, of at least one lens unit included in the one or two second lens units, for zooming from the wide angle end to the telephoto end, ν2n represents a maximum Abbe number of at least one Abbe number of at least one negative lens included in the one or two second lens units, a sign of the moving amount is positive in a case where the lens unit moves to the image side, n1anav represents an average value of at least one refractive index, with respect to a d-line, of at least one negative lens included in the 1a lens subunit, and an Abbe number ν is defined by an expression $$\nu=(nd-1)/(nF-nC)$$

where nF represents a refractive index with respect to an F-line, nd represents a refractive index with respect to the d-line, and nC represents a refractive index with respect to a C-line.

2. An imaging apparatus comprising:
a zoom lens of claim 1; and
an imaging element that receives an image formed by the zoom lens.

3. A zoom lens comprising in order from an object side to an image side:
a first lens unit having a positive refractive power and configured not to be moved for zooming;
one or two second lens units including a lens unit closest to the image side and having a negative refractive power, the one or two second lens units configured to be monotonously moved to the image side for zooming from a wide angle end to a telephoto end;
one or two third lens units including a lens unit closest to the object side and having a negative refractive power, the one or two third lens units configured to be moved for zooming; and
a fourth lens unit closest to the image side and having a positive refractive power,
wherein the first lens unit comprises, in order from the object side to the image side, a 1a lens subunit having a negative refractive power and configured not to be moved for focusing, a 1b lens subunit having a positive refractive power and configured to be moved for focusing, and a 1c lens subunit having a positive refractive power and configured not to be moved for focusing,
wherein conditional expressions $$1.0<|f1/f2t|<2.5,$$

$$2.0<|m2/f2t|<5.0,$$

$$65<\nu2n, \text{ and}$$

$$-4.5\times10^{-3}<(\theta1apav-\theta1anav)/(\nu1apav-\nu1anav)<-2.0\times10^{-3}$$

are satisfied where f1 represents a focal length of the first lens unit, f2t represents a composite focal length at the telephoto end of the one or two second lens units, m2 represents a maximum moving amount of at least one moving amount, of at least one lens unit included in the one or two second lens units, for zooming from the wide angle end to the telephoto end, ν2n represents a maximum Abbe number of at least one Abbe number of at least one negative lens included in the one or two second lens units, a sign of the moving amount is positive in a case where the lens unit moves to the image side, ν1apav represents an average value of at least one Abbe number of at least one positive lens included in the 1a lens subunit, ν1anav represents an average value of at least one Abbe number of at least one negative lens included in the 1a lens subunit, θ1apav represents an average value of at least one relative partial dispersion of at least one positive lens included in the 1a lens subunit, θ1anav represents an average value of at least one relative partial dispersions of at least one negative lens included in the 1a lens subunit, and an Abbe number ν is defined by an expression $$\nu=(nd-1)/(nF-nC)$$

where nF represents a refractive index with respect to an F-line, nd represents a refractive index with respect to a d-line, and nC represents a refractive index with respect to a C-line, and a relative partial dispersion θ is defined by an expression $$\theta=(ng-nF)/(nF-nC)$$

where ng represents a refractive index with respect to a g-line.

4. An imaging apparatus comprising:
a zoom lens of claim 3; and
an imaging element that receives an image formed by the zoom lens.

5. A zoom lens comprising in order from an object side to an image side:
a first lens unit having a positive refractive power and configured not to be moved for zooming;
one or two second lens units including a lens unit closest to the image side and having a negative refractive power, the one or two second lens units configured to be monotonously moved to the image side for zooming from a wide angle end to a telephoto end;
one or two third lens units including a lens unit closest to the object side and having a negative refractive power, the one or two third lens units configured to be moved for zooming; and
a fourth lens unit closest to the image side and having a positive refractive power,
wherein the first lens unit comprises, in order from the object side to the image side, a 1a lens subunit having a negative refractive power and configured not to be moved for focusing, a 1b lens subunit having a positive refractive power and configured to be moved for focusing, and a 1c lens subunit having a positive refractive power and configured not to be moved for focusing,
wherein conditional expressions $$1.0<|f1/f2t|<2.5,$$

$$2.0<|m2/f2t|<5.0,$$

$$65<\nu2n, \text{ and}$$

$$1.5<f1b/f1<6.0$$

are satisfied where f1 represents a focal length of the first lens unit, f2t represents a composite focal length at the telephoto end of the one or two second lens units, m2 represents a maximum moving amount of at least one moving amount, of at least one lens unit included in the one or two second lens units, for zooming from the wide angle end to the telephoto end, ν2n represents a maximum Abbe number of at least one Abbe number of at least one negative lens included in the one or two second lens units, a sign of the moving amount is positive in a case where the lens unit moves to the image side, f1b represents a focal length of the 1b lens subunit, and an Abbe number ν is defined by an expression $$\nu=(nd-1)/(nF-nC)$$

where nF represents a refractive index with respect to an F-line, nd represents a refractive index with respect to a d-line, and nC represents a refractive index with respect to a C-line.

6. An imaging apparatus comprising:
   a zoom lens of claim 5; and
   an imaging element that receives an image formed by the zoom lens.

7. A zoom lens comprising in order from an object side to an image side:
   a first lens unit having a positive refractive power and configured not to be moved for zooming;
   one or two second lens units including a lens unit closest to the image side and having a negative refractive power, the one or two second lens units configured to be monotonously moved to the image side for zooming from a wide angle end to a telephoto end;
   one or two third lens units including a lens unit closest to the object side and having a negative refractive power, the one or two third lens units configured to be moved for zooming; and
   a fourth lens unit closest to the image side and having a positive refractive power,
   wherein the first lens unit comprises, in order from the object side to the image side, a 1a lens subunit having a negative refractive power and configured not to be moved for focusing, a 1b lens subunit having a positive refractive power and configured to be moved for focusing, and a 1c lens subunit having a positive refractive power and configured not to be moved for focusing,
   wherein conditional expressions $1.0 < |f1/f2t| < 2.5$, $2.0 < |m2/f2t| < 5.0$, $65 < v2n$, and $-7.0 < f2w/fw < -1.5$ are satisfied where f1 represents a focal length of the first lens unit, f2t represents a composite focal length at the telephoto end of the one or two second lens units, m2 represents a maximum moving amount of at least one moving amount, of at least one lens unit included in the one or two second lens units, for zooming from the wide angle end to the telephoto end, v2n represents a maximum Abbe number of at least one Abbe number of at least one negative lens included in the one or two second lens units, a sign of the moving amount is positive in a case where the lens unit moves to the image side, fw represents a focal length of the zoom lens at the wide angle end, and f2w represents a composite focal length of the one or two second lens units at the wide angle end, and an Abbe number v is defined by an expression $v = (nd-1)/(nF-nC)$ where nF represents a refractive index with respect to an F-line, nd represents a refractive index with respect to a d-line, and nC represents a refractive index with respect to a C-line.

8. An imaging apparatus comprising:
   a zoom lens of claim 7; and
   an imaging element that receives an image formed by the zoom lens.

* * * * *